United States Patent [19]

Kakuta et al.

[11] Patent Number: 5,274,516

[45] Date of Patent: Dec. 28, 1993

[54] MULTI-CASSETTE RECORDING AND REPRODUCING APPARATUS

[75] Inventors: Susumu Kakuta; Naomichi Nishimoto; Hiroshi Horii, all of Tokyo, Japan

[73] Assignee: Victor Company of Japan, Ltd., Yokohama, Japan

[21] Appl. No.: 765,179

[22] Filed: Sep. 26, 1991

[30] Foreign Application Priority Data

Sep. 29, 1990 [JP] Japan ................. 2-262387
Sep. 29, 1990 [JP] Japan ................. 2-262388

[51] Int. Cl.$^5$ .................................. G11B 15/68
[52] U.S. Cl. ......................... 360/92; 360/98.01; 360/98.04; 369/85
[58] Field of Search .............. 360/90, 91, 92, 93, 360/94, 96.1, 97.02, 97.03, 98.01, 98.04, 99.01; 369/75.1, 75.2, 85

[56] References Cited

U.S. PATENT DOCUMENTS

| | | | |
|---|---|---|---|
| 4,563,713 | 1/1986 | Cahoon et al. | 360/75 |
| 4,823,333 | 4/1989 | Satoh et al. | 369/84 |
| 4,941,841 | 7/1990 | Darden et al. | 369/75.1 |
| 5,119,270 | 6/1992 | Bolton et al. | 360/97.03 |

FOREIGN PATENT DOCUMENTS 2-194734 8/1990 Japan .

OTHER PUBLICATIONS

Advertisement of "Videocart" by Asaca Co., Ltd. vol. 43, No. 4 (1989).
"CM Bank System Using D2 Digital VTR" Journal of Japanese Television Society, vol. 43, No. 4 (1989); pp. 329-334.

Primary Examiner—David P. Porta
Attorney, Agent, or Firm—Lowe, Price, LeBlanc & Becker

[57] ABSTRACT

A multi-cassette recording and reproducing apparatus includes at least one rack for storing a stack of tape cassettes and disk cassettes, the tape cassettes containing magnetic tapes, the disk cassettes containing disks; a tape drive unit for subjecting a magnetic tape of a tape cassette to information recording and reproducing processes; a disk drive unit for subjecting a disk of a disk cassette to information recording and reproducing processes; and a common cassette selecting and carrying mechanism for selecting one of the tape cassettes in the rack, for carrying the selected tape cassette between the rack and the tape drive unit, for selecting one of the disk cassettes in the rack, and for carrying the selected disk cassette between the rack and the disk drive unit.

3 Claims, 15 Drawing Sheets

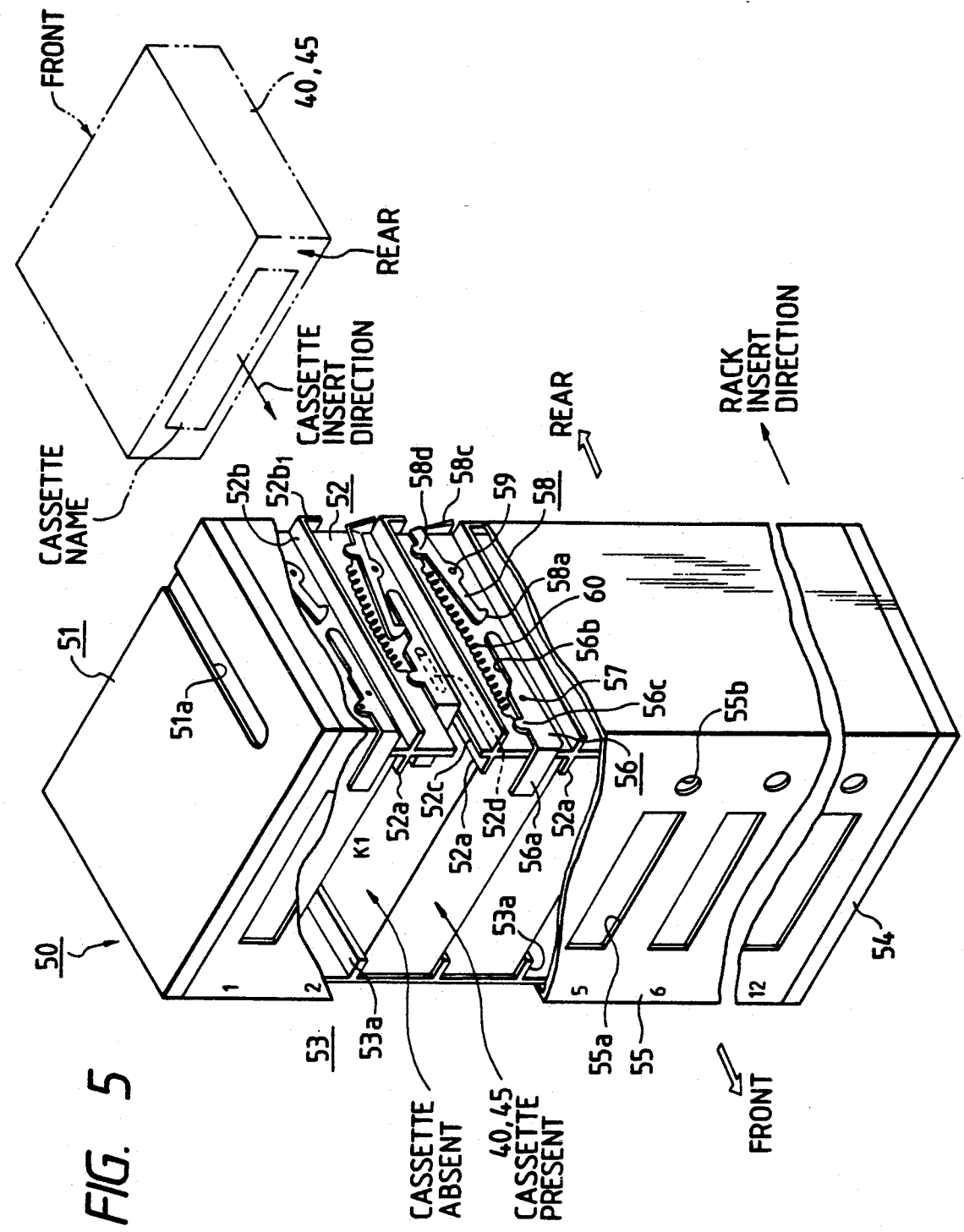

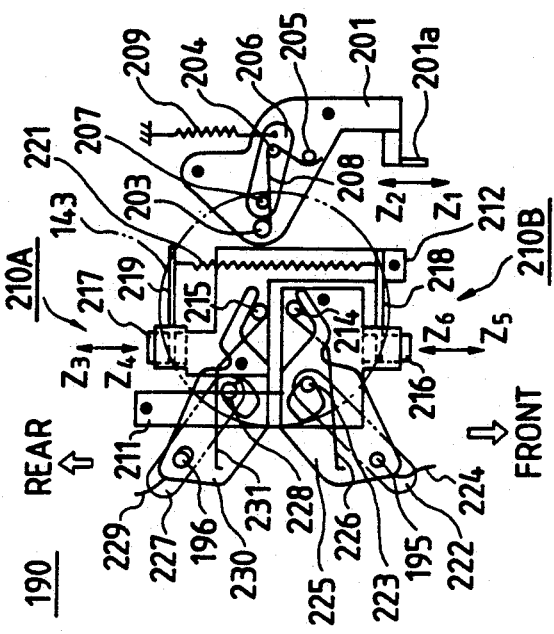
FIG. 15
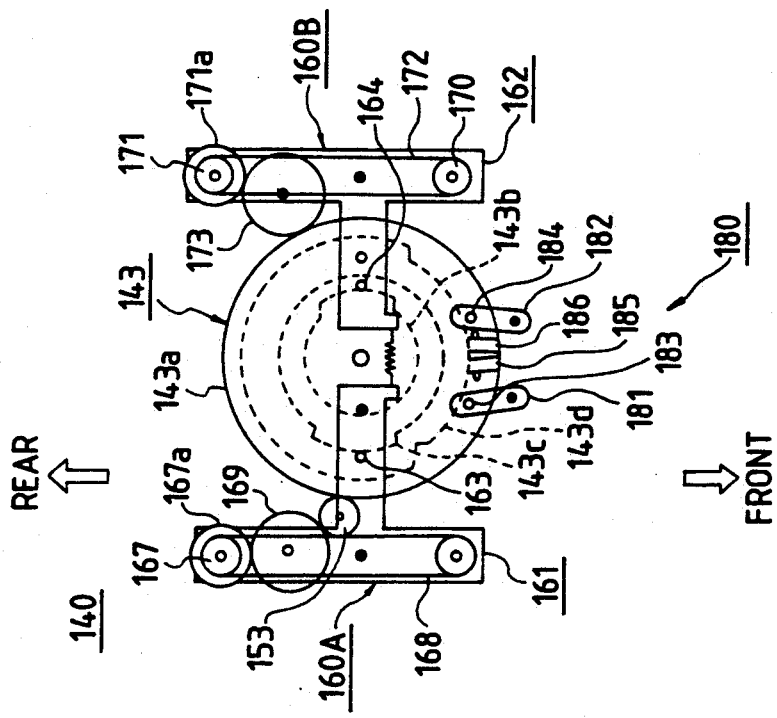
FIG. 16A
FIG. 16B
FIG. 14

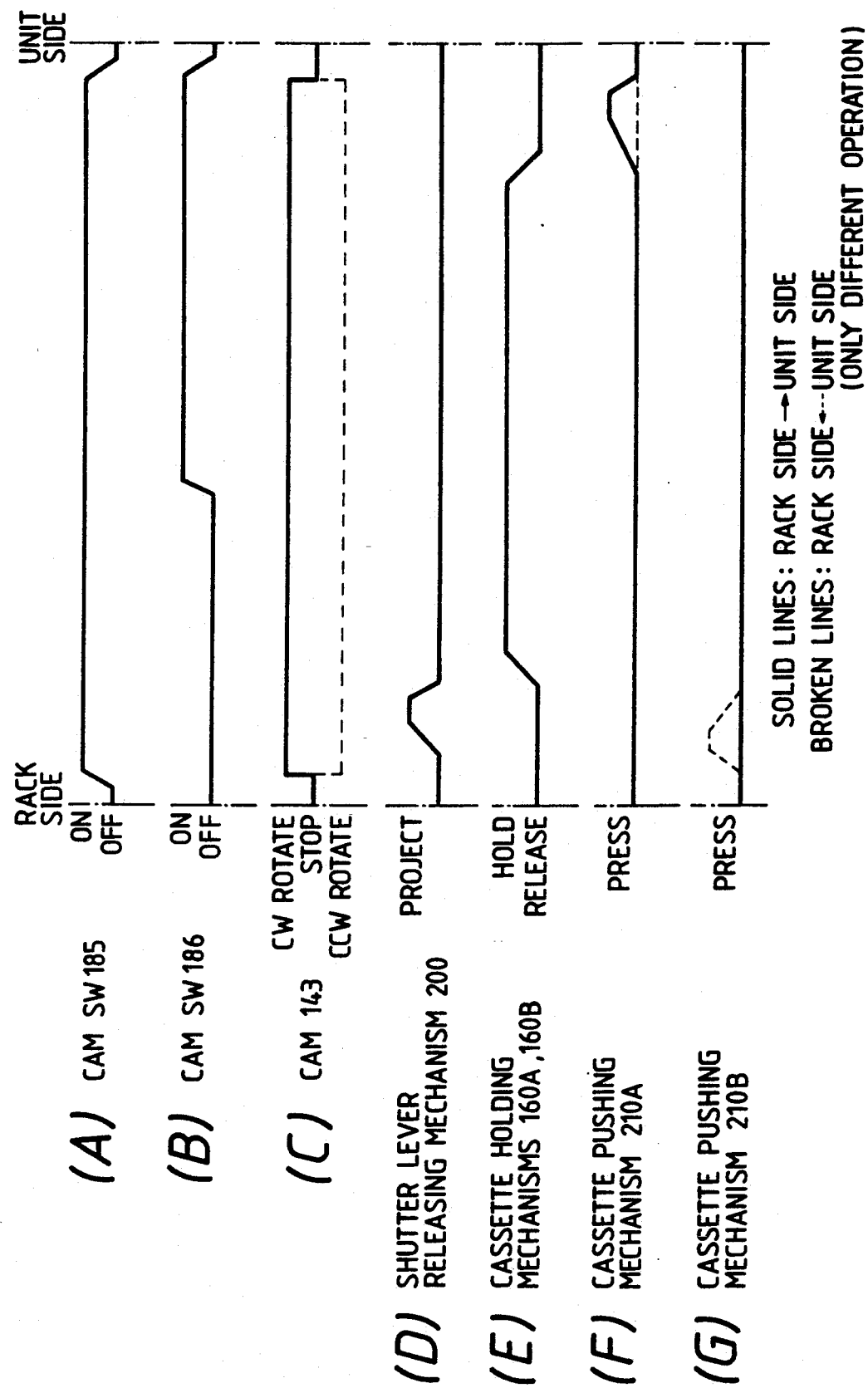

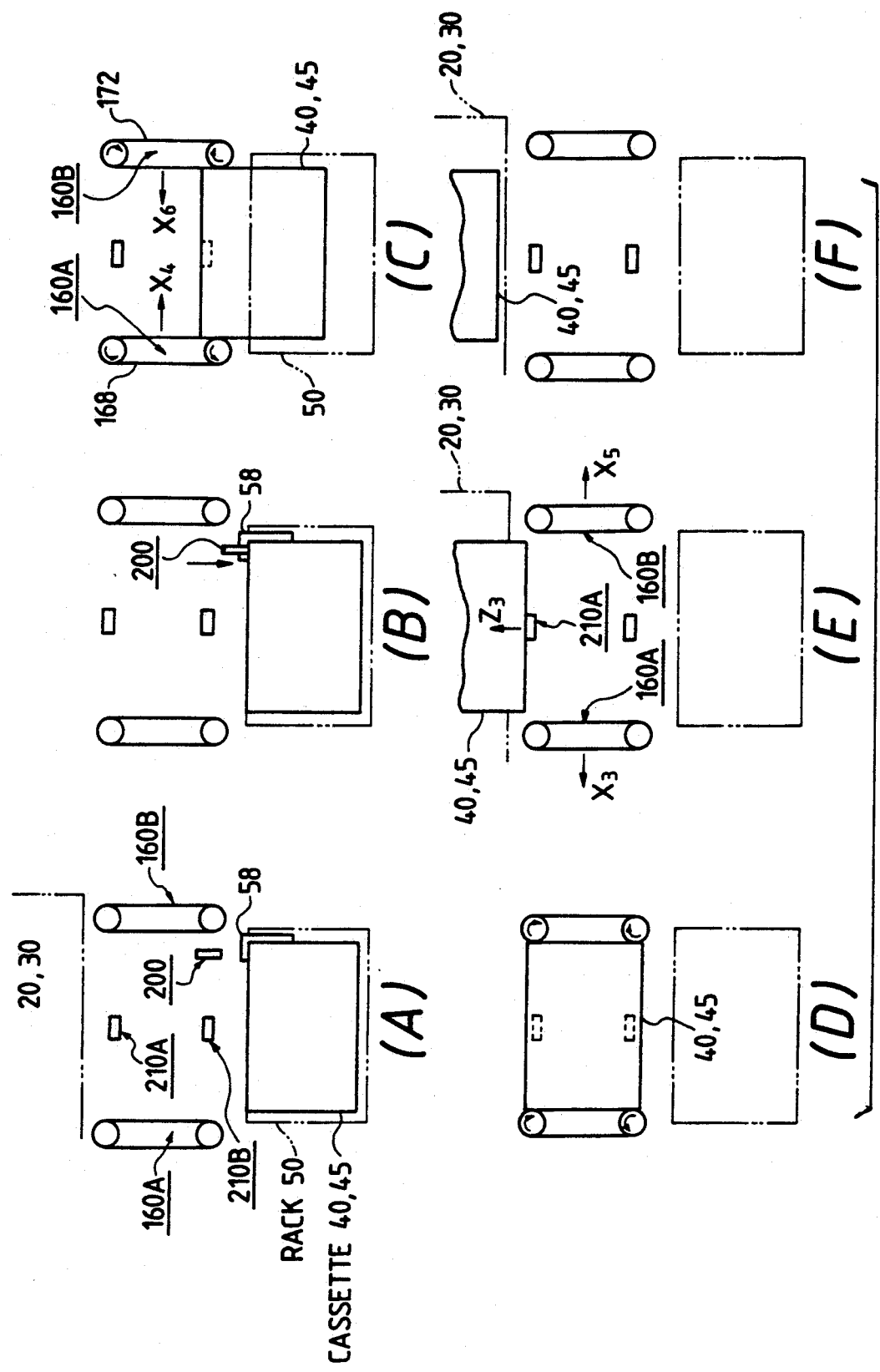

MULTI-CASSETTE RECORDING AND REPRODUCING APPARATUS

BACKGROUND OF THE INVENTION

This invention relates to a multi-cassette recording and reproducing apparatus in which cassettes in racks are loaded into cassette drive units to record and reproduce a large amount of video information, audio information, and other information.

In the field of broadcast equipments, multi-cassette recording and reproducing apparatuses are used for broadcasting commercials. As will be explained later, a prior-art multi-cassette recording and reproducing apparatus has some problem.

SUMMARY OF THE INVENTION

It is an object of this invention to provide an improved multi-cassette recording and reproducing apparatus.

A first aspect of this invention provides a multi-cassette recording and reproducing apparatus comprising at least one rack for storing a stack of tape cassettes and disk cassettes, the tape cassettes containing magnetic tapes, the disk cassettes containing disks; a tape drive unit for subjecting a magnetic tape of a tape cassette to information recording and reproducing processes; a disk drive unit for subjecting a disk of a disk cassette to information recording and reproducing processes; and common cassette selecting and carrying means for selecting one of the tape cassettes in the rack, for carrying the selected tape cassette between the rack and the tape drive unit, for selecting one of the disk cassettes in the rack, and for carrying the selected disk cassette between the rack and the disk drive unit.

A second aspect of this invention provides a multi-cassette recording and reproducing apparatus comprising at least one rack for storing a stack of cassettes containing information recording media; at least one cassette drive unit for subjecting an information recording medium to information recording and reproducing processes; cassette carrying means, provided between the rack and the cassette drive unit, for selecting one of the cassettes in the rack, for carrying the selected cassette from the rack to the cassette drive unit, for receiving a cassette from the cassette drive unit, and for carrying the received cassette from the cassette drive unit to the rack; and cassette mediate carrying means, provided in the cassette carrying means, for taking out one of the cassettes from the rack, for carrying the taken-out cassette from the rack to the cassette drive unit while holding the cassette, for pushing the carried cassette into the cassette drive unit, for receiving a cassette ejected from the cassette drive unit, for carrying the received cassette from the cassette drive unit to the rack while holding the cassette, and for pushing the carried cassette into the rack and thereby returning the cassette to the rack.

BRIEF DESCRIPTION OF THE DRAWINGS

FIG. 5 is a perspective front view of a rack in the apparatus of FIGS. 1 and 2, with parts broken away.

FIG. 14 is a diagram showing the positional relation among the members of FIG. 12.

FIG. 15 is a diagram showing the positional relation among the members of FIG. 13.

FIGS. 16A and 16B are sectional views of a cassette pushing mechanism in the apparatus of FIGS. 1 and 2.

FIG. 17 is a timing diagram showing operation timing of the cassette mediate carrying mechanism.

FIGS. 18(a)–(f) are a diagram showing various stages in a sequence of operation of the cassette mediate carrying mechanism.

DESCRIPTION OF THE PRIOR ART

Figure 20A:
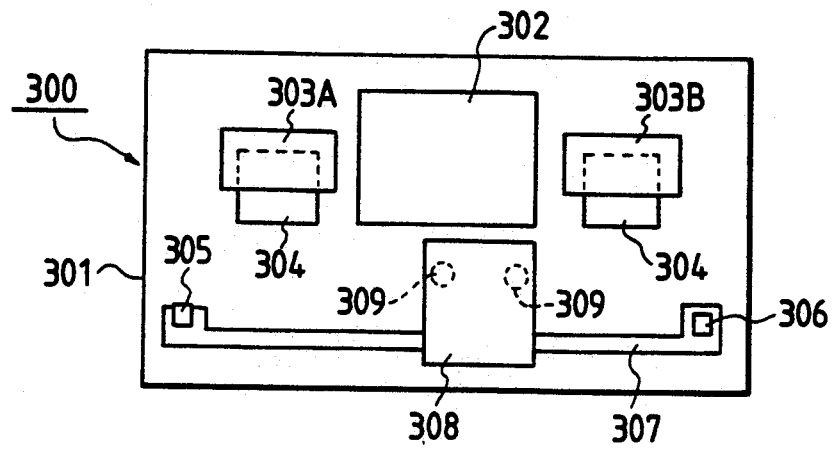
FIG. 20A is a plan view of a prior-art multi-cassette recording and reproducing apparatus.
Figure 20B:
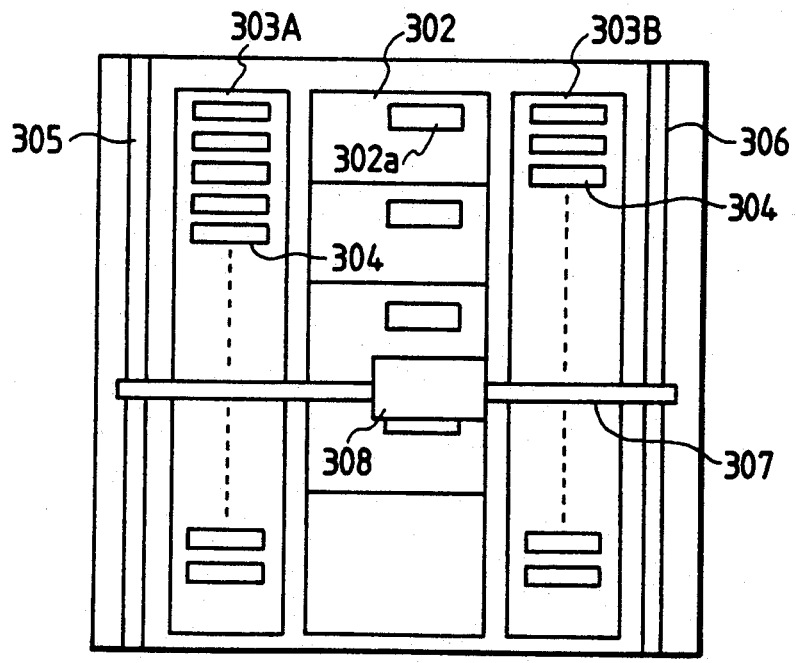
FIG. 20B is a front view of the prior-art apparatus of FIG. 20A.

With reference FIGS. 20A and 20B, a prior-art multi-cassette recording and reproducing apparatus 300 includes a frame 301, and a plurality of tape drive units 302 stacked in a central part of the frame 301. Racks 303A and 303B accommodating tape cassettes are located at the left-hand side and the right-hand side of the stack of the tape drive units 302.

A pair of vertically-extending guide rails 305 and 306 is provided frontward and outward of the racks 303A and 303B. A guide rail 307 extends horizontally between the vertical guide rails 305 and 306, and is slidably supported by the vertical guide rails 305 and 306. The horizontal guide rail 307 can move vertically.

A tape cassette carrier 308 provided with rollers 309 is slidably mounted on the horizontal guide rail 307. The tape cassette carrier 308 can move rightward and leftward along the horizontal guide rail 307.

The tape cassette carrier 308 is moved to a position frontward of the rack 303A or 303B, and then the horizontal guide rail 307 is moved vertically along the vertical guide rail 307 so that the tape cassette carrier 308 reaches a position frontward of a desired tape cassette 304. The desired tape cassette 304 is removed from the rack 303A or 303B to the tape cassette carrier 308. In this way, the desired tape cassette 304 is selected and is placed on the tape cassette carrier 308. Then, the tape cassette carrier 308 is moved to a position frontward of a cassette insertion opening 302a of a tape drive unit 302, and the desired tape cassette 304 is loaded into the tape drive unit 302 via the opening 302a. The desired tape cassette 304 is subjected to information recording and reproducing processes by the tape drive unit 302. After the information recording and reproducing processes are completed, the desired tape cassette 304 is returned to the original place within the rack 303A or 303B.

The prior-art multi-cassette recording and reproducing apparatus of FIGS. 20A and 20B can record and reproduce a large amount of information into and from tape cassettes 304, and can file a large amount of video information and other information in the tape cassettes 304. However, in the prior-art multi-cassette recording and reproducing apparatus of FIGS. 20A and 20B, an access time spent to find a desired position of a tape tends to be long.

DESCRIPTION OF THE PREFERRED EMBODIMENT

System Structure

A system structure of a multi-cassette recording and reproducing apparatus of this invention will be described hereinafter by referring to FIG. 1 to FIG. 4.

Figure 1:
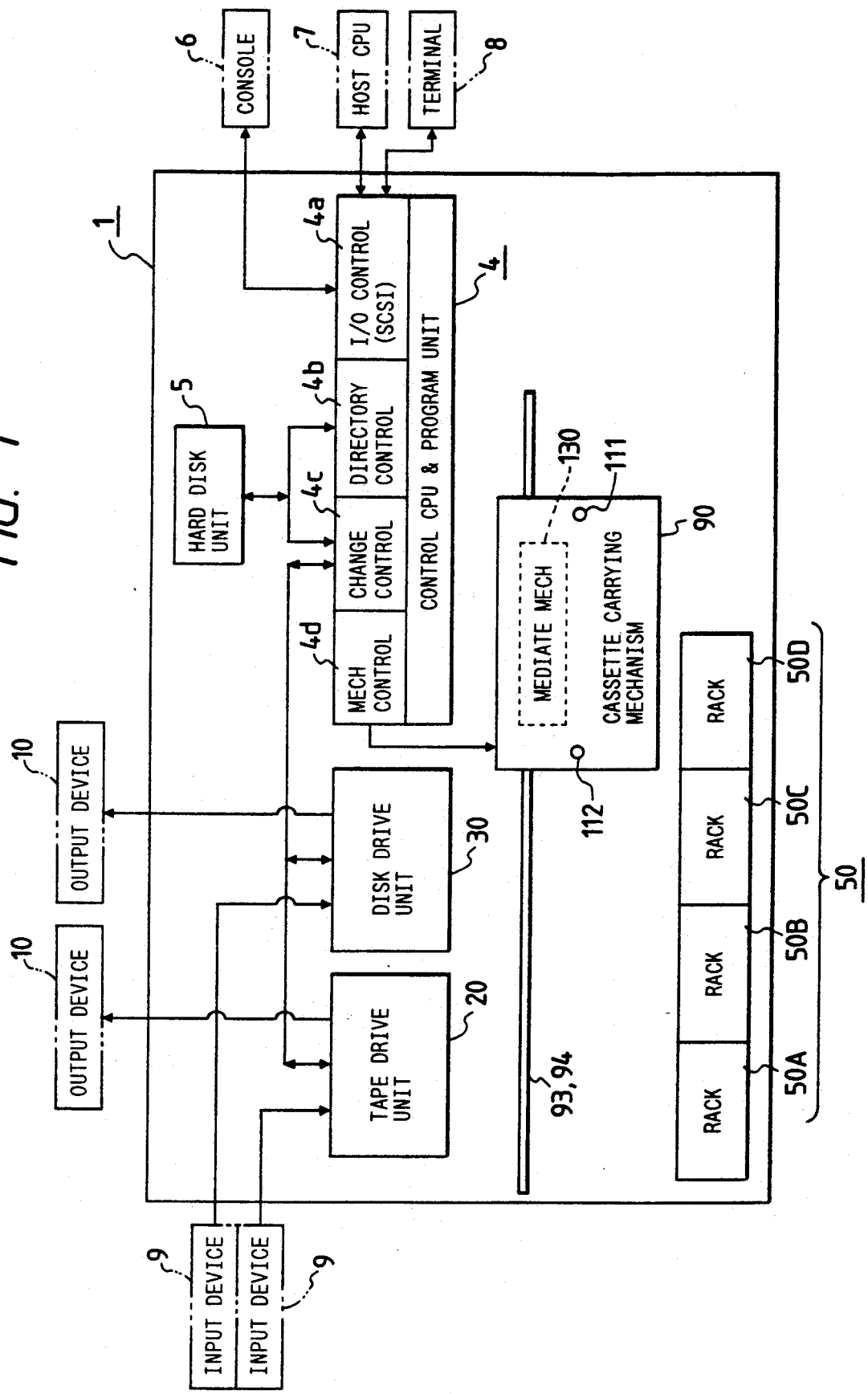
FIG. 1 is a diagram of a multi-cassette recording and reproducing apparatus according to an embodiment of this invention.
Figure 2:
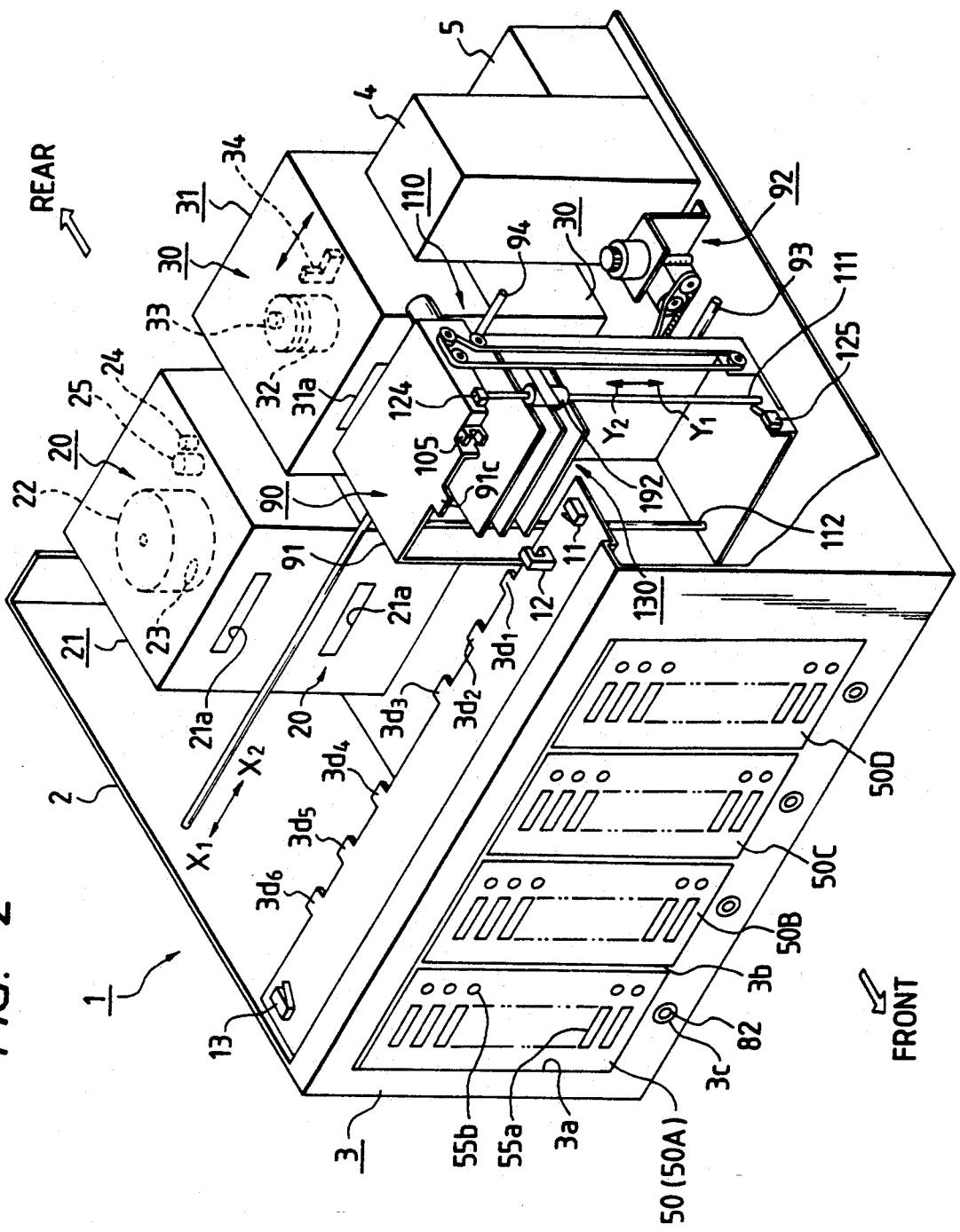
FIG. 2 is a perspective view of the multi-cassette recording and reproducing apparatus of FIG. 1.
Figure 3:
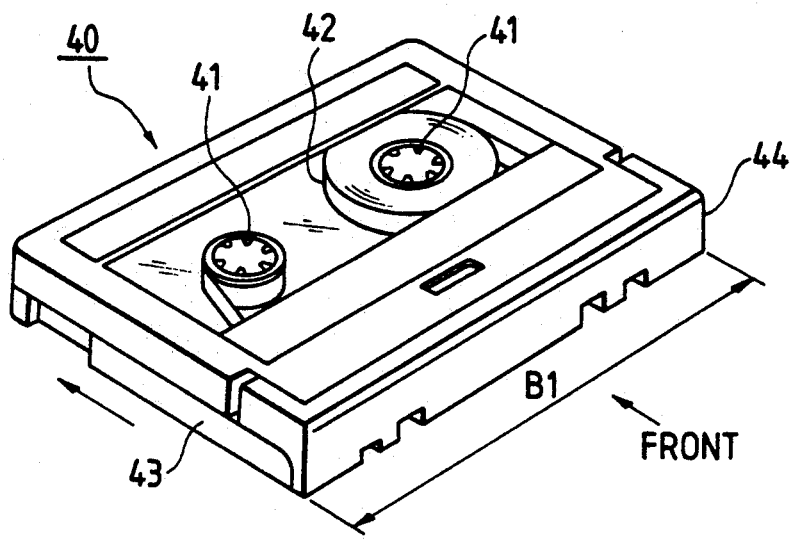
FIG. 3 is a perspective view of a tape cassette used in the apparatus of FIGS. 1 and 2.
Figure 4:
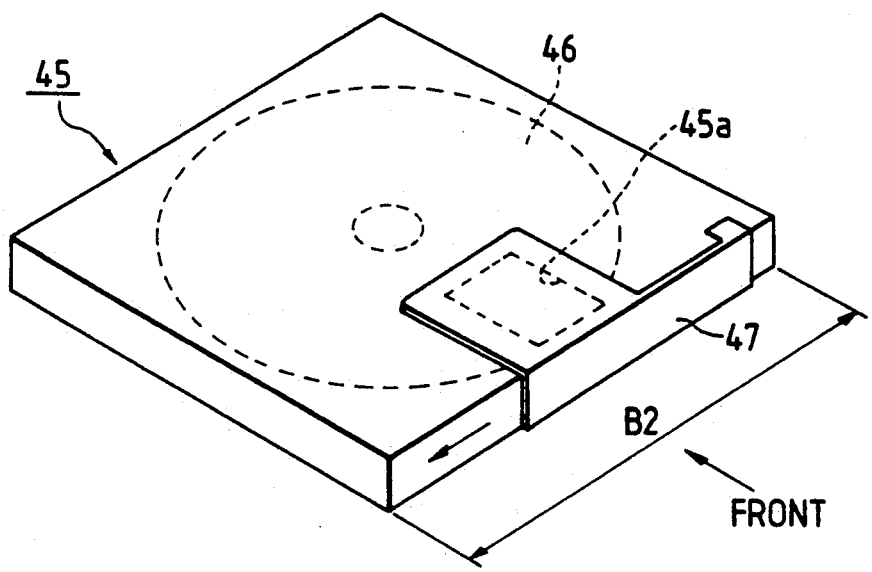
FIG. 4 is a perspective view of a disk cassette used in the apparatus of FIGS. 1 and 2.

With reference to FIGS. 1 and 2, a multi-cassette recording and reproducing apparatus 1 includes an arrangement 50 of racks 50A–50D which is placed rearward of a front panel 3. It should be noted that the multi-cassette recording and reproducing apparatus 1 will be also referred to simply as the apparatus 1. The racks 50A–50D are separated by partition panels 3b, and are arranged laterally. Each of the racks 50A–50D contains a stack of tape cassettes 40 or a stack of disk cassettes 45, which are shown in FIGS. 3 and 4.

As will be explained later, each of the racks 50A–50D can be removed from and placed into a normal place within the apparatus 1 via a rack insertion opening 3a extending through the front panel 3. Each of the racks 50A and 50B contains a stack of tape cassettes 40 each having a DAT magnetic tape 42 wound on a pair of reels 41 as shown in FIG. 3. Each of the racks 50C and 50D contains a stack of disk cassettes 45 each having a disk 46 as shown in FIG. 4.

It should be noted that tape cassettes 40 may be contained in the racks 50C and 50D while disk cassettes 45 may be contained in the racks 50A and 50B. In addition, a mixture of tape cassettes 40 and disk cassettes 45 may be contained in each of the racks 50A–50D. To realize such arrangements, it is preferable that the width B1 of a tape cassette 40 approximately equals the width B2 of a disk cassette 45 (see FIGS. 3 and 4) and thus both of the tape cassette 40 and the disk cassette 45 can be handled by a common cassette mediate carrying mechanism 130 (see FIG. 10) which will be explained later.

A stack of tape drive units 20 and a stack of disk drive units 30 are located in a rear region within a frame 2 of the apparatus 1. The stack of the tape drive units 20 and the stack of the disk drive units 30 may be exchanged in position.

Each of the tape drive units 20 serves to subject a tape cassette 40 to information recording and reproducing processes. Each of the tape drive units 20 is composed of a known DAT recording and reproducing unit including a box 21, a rotary drum 22 disposed in the box 21, a magnetic head 23 mounted on the rotary drum 22, a capstan 24 disposed in the box 21, and a pinch roller 25 disposed in the box 21. A desired tape cassette 40 in the racks 50A and 50B is selected by a cassette carrying mechanism 90 (see FIG. 9) and a cassette mediate carrying mechanism 130 (see FIG. 10), and the selected tape cassette 40 is inserted into a tape drive unit 20 via a cassette insertion opening 21a. When the selected tape cassette 40 is inserted into the tape drive unit 20, a slidable member 43 of the tape cassette 40 is moved by a loading device (not shown) in a direction denoted by the arrow in FIG. 3. As the slidable member 43 of the tape cassette 40 is moved, a lid 44 is opened upward and a magnetic tape 42 is brought into contact with the rotary drum 22. While the magnetic tape 42 is driven by the capstan 24 and the pinch roller 25, the magnetic tape 42 is subjected by the magnetic head 23 to information recording and reproducing processes.

The tape drive units 20 are of the DAT type, enabling the record and reproduction of high-quality audio information into and from a tape cassette 40. In addition, the tape drive units 20 enable the record and reproduction of digitized and compressed video information with a high quality. A single tape cassette 40 can store about 1.3 giga-bytes of information. The tape cassette 40 can hold the recorded information for a long time.

It should be noted that the tape drive units 20 may be replaced by cassette drive units or tape drive units 20 designed for a well-known audio tape or a well-known video tape other than a DAT tape.

Each of the disk drive units 30 serves to subject a disk cassette 45 to information recording and reproducing processes. The disk cassette 45 contains an opto-magnetic disk or an optical disk 46, into and from which information can be recorded and reproduced. Each of the disk drive units 30 includes a box 31, a motor 32 disposed in the box 31, a turn table 33 mounted on a shaft of the motor 32, and an opto-magnetic pickup (or an optical pickup) 34 disposed in the box 31 and being movable at a high speed in directions denoted by the arrows in FIG. 2. A desired disk cassette 45 in the racks 50C and 50D is selected by a cassette carrying mechanism 90 (see FIG. 9) and a cassette mediate carrying mechanism 130 (see FIG. 10), and the selected disk cassette 45 is inserted into a disk drive unit 30 via a cassette insertion opening 31a. When the selected disk cassette 45 is inserted into the disk drive unit 30, a lid 47 is opened by a loading device (not shown) in a direction denoted by the arrow in FIG. 4. In addition, a disk 46 is placed on the turn table 33. The opto-magnetic pickup 34 is opposed to an opening 45a of the disk cassette 45, and the disk 46 is subjected to information recording and reproducing processes. The disk drive units 30 enable the record and reproduction of a large amount of information into and from a disk cassette 45. In addition, the disk drive units 30 enable a quick access to the disk 46 within the disk cassette 45.

A cassette carrying mechanism 90 (see FIG. 9) and a cassette mediate carrying mechanism 130 (see FIG. 10) are provided between the racks 50A–50D, the tape drive units 20, and the disk drive units 30. The cassette carrying mechanism 90 and the cassette mediate carrying mechanism 130 compose cassette selecting and carrying means. The cassette carrying mechanism 90 serves to transport a cassette 40 or 45 between a position frontward of the rack 50A, 50B, 50C, or 50D and a position frontward of the cassette drive unit 20 or the disk drive unit 30. The cassette mediate carrying mechanism 130 serves to remove a cassette 40 or 45 from the rack 50A, 50B, 50C, or 50D, to insert the cassette 40 or 45 into the cassette drive unit 20 or the disk drive unit 30, and to return the cassette 40 or 45 to the rack 50A, 50B, 50C, or 50D.

As shown in FIG. 2, the cassette carrying mechanism 90 includes a carriage 91 containing the cassette mediate carrying mechanism 130. The carriage 91 can be moved in horizontal directions (denoted by the arrows X1 and X2) along a pair of horizontally-extending lower guide rail 93 and upper guide rail 94. The cassette mediate carrying mechanism 130 can be moved in vertical directions (denoted by the arrows Y1 and Y2) along a pair of vertically-extending right-hand guide rail 111 and left-hand guide rail 112 disposed in the carriage 91.

the cassette mediate carrying mechanism 130 can take out either a tape cassette 40 or a disk cassette 45 from the rack 50A, 50B, 50C, or 50D, and can return the tape cassette 40 or the disk cassette 45 to the rack 50A, 50B, 50C, or 50D. In addition, the cassette mediate carrying mechanism 130 can insert the tape cassette 40 or the disk cassette 45 into the tape drive unit 20 or the disk drive unit 30, and can receive the tape cassette 40 or the disk cassette 45 from the tape drive unit 20 or the disk drive unit 30. In this way, the cassette mediate carrying mechanism 130 can handle both a tape cassette 40 and a disk cassette 45. Such operation of the cassette mediate carrying mechanism 130 is enabled by the approximately equal widths of a tape cassette 40 and a disk cassette 45. Thus, a single cassette mediate carrying mechanism 130 suffices for different types of cassettes. This is advantageous in manufacturing cost. In addition, the cassette mediate carrying mechanism 130 enables an exchange between positions of cassettes 40 and 45 in the racks 50A-50D within the apparatus 1.

The cassette carrying mechanism 90 and the cassette mediate carrying mechanism 130 select a desired cassette 40 or 45, transporting the selected cassette 40 or 45 from the rack arrangement 50 to the tape drive unit 20 or the disk drive unit 30. After information recording and reproducing processes are completed, the cassette carrying mechanism 90 and the cassette mediate carrying mechanism 130 receive the cassette 40 or 45 from the tape drive unit 20 or the disk drive unit 30, and then return the cassette 40 or 45 to the rack arrangement 50.

The cassette carrying mechanism 90 and the cassette mediate carrying mechanism 130 which compose cassette selecting and carrying means are provided between the racks 50A-50D, the tape drive units 20, and the disk drive units 30 in this way, and thereby it is possible to locate many racks 50A-50D at a side of the front panel 3 while providing good operation characteristics. In addition, many tape and disk drive units 20 and 30 can be located within the frame 2. Furthermore, a layout of parts in the apparatus 1 can be done with a good efficiency of use of a space. Therefore, it is possible to realize a small width, a small height, and a small depth of the apparatus 1. In other words, it is possible to realize small dimensions of the apparatus 1. Since the side of the front panel 3 contains only the racks 50A-50D and has no drive mechanism members, safety is attained during operation.

As shown in FIG. 1, a control CPU and program unit 4 and a hard disk memory unit 5 are disposed in a right-hand rear region within the frame 2.

The control CPU and program unit 4 includes an input output control section 4a, a directory management control section 4b, a changer system control section 4c, and a mechanism control section 4d. The input output control section 4a is connected to input operation devices such as a console 6 for local control, a host CPU 7, and terminal devices 8. The directory management control section 4b is connected to the hard disk memory unit 5. The changer system control section 4c is connected to the hard disk memory unit 5, the tape drive units 20, and the disk drive units 30. The mechanism control section 4d functions to control the cassette carrying mechanism 90 and the cassette mediate carrying mechanism 130.

The hard disk memory unit 5 includes a hard disk (not shown) which stores directory management information (cassette maps, cassette names, a library, data base, backup data, and others) of cassettes 40 and 45 in the racks 50A-50D, cassette movement management information, C1 and C2 error management information of specific characteristics owned by disks 46 within the disk cassettes 45, and other information. The directory management control section 4b and the changer system control section 4c are controlled in response to the stored information. Therefore, a plurality of input operation devices 6, 7, and 8 can be connected to the apparatus 1, and the apparatus 1 can be operated by independent operations thereof. Thus, the number of types of the input operation can be increased in comparison with the case where system management of the apparatus 1 is done only by a single host CPU 7.

The tape drive units 20 and the disk drive units 30 are connected to input devices 9 such as television cameras, video equipments, or audio equipments, so that information from the input devices 9 can be recorded on occasion.

In addition, the tape drive units 20 and the disk drive units 30 are connected to output devices 10 such as video monitors, or amplifiers and loudspeakers.

The tape drive units 20 and the disk drive units 30 can be driven simultaneously. In an example of the simultaneous drive, while a tape drive unit 20 is driven to execute a long-time reproducing process, a disk drive unit 30 enabling high-speed access is driven to quickly reproduce information from a disk 46 in response to a video scene outputted from the tape drive unit 20. In another example of the simultaneous drive, while a tape drive unit 20 is driven to execute a long-time reproducing process, a disk drive unit 30 is driven to receive reproduced image information from the tape drive unit 20 and to quickly record the received image information into a disk 46 as a still picture. During such simultaneous drive, the tape drive unit 20 and the disk drive unit 30 are controlled by the control CPU and program unit 4 and the hard disk memory unit 5.

In another example of operation, a disk drive unit 30 is driven to select menu information from a disk 46, and a tape drive unit 20 is driven to execute a long-time reproducing process in response to the selected menu information. By operating a tape drive unit 20 and a disk drive unit 30 in liaison with each other as described previously, it is possible to use both features of the tape drive unit 20 and the disk drive unit 30. Thus, the apparatus 1 can be used in an increased number of different ways.

According to a first modification of the multi-cassette recording and reproducing apparatus 1, tape drive units 20 are provided while disk drive units 30 are omitted. According to a second modification of the multi-cassette recording and reproducing apparatus 1, disk drive units 30 are provided while tape drive units 20 are omitted. In these first and second modifications, it is necessary to match cassettes stacked in racks 50A-50D with the provided drive units.

Rack Structure

A structure of the rack in the multi-cassette recording and reproducing apparatus 1 of this invention will be described hereinafter with reference to FIG. 5 to FIG. 8.

As shown in FIG. 5, a rack in the rack arrangement 50 includes a ceiling panel 51, a bottom panel 54, a right-hand side panel 52, and a left-hand side panel 53 which are fixedly combined into a box.

The right-hand side panel 52 is formed with steps or projections 52a which are spaced in a vertical direction. Similarly, the left-hand side panel 53 is formed with steps or projections 53a. The steps 52a and 53a project inwardly and oppose each other. The interior of the rack in the rack arrangement 50 is separated into spaces K1 defined by the steps 52a and 53a. Cassettes 40 or 45 can be accommodated in the respective spaces K1 in a stacked manner.

A decorative cover panel 55 extends between the front edges of the right-hand side panel 52 and the left-hand side panel 53. The rear of the rack arrangement 50 is open. Cassettes 40 or 45 can be inserted into the rack arrangement 50 via the rear opening (see FIG. 6). Thus, the cassettes 40 or 45 can not be inserted from a front side in FIG. 5. The rack arrangement 50 is removed from the apparatus 1, and then the cassettes 40 or 45 can be inserted into the rack arrangement 50 in a stacked manner. Therefore, during the operation of the apparatus 1, it is possible to prevent a cassette 40 or 45 from being intentionally inserted and thus the safety of the apparatus 1 can be maintained. Under conditions where the rack arrangement 50 is placed in the apparatus 1, the cassette mediate carrying mechanism 130 (see FIG. 10) can insert and remove cassettes 40 or 45 into and from the rack arrangement 50 via its rear opening.

The decorative cover panel 55 has rectangular openings 55a and circular openings 55b at positions corresponding to the positions accommodating cassettes 40 or 45 respectively. For example, the cassette names of accommodated cassettes 40 or 45 can be seen via the openings 55a. The presence and absence of cassettes 40 or 45 can be easily and visually detected via the openings 55b by the operation of cassette indication levers 56 which will be explained later. An end of each cassette indication lever 56 has an L-shaped section 56a coated with bright-color paint such as green paint. In the case where cassettes 40 or 45 are placed in the rack arrangement 50, as shown in the first uppermost step to the third uppermost step in FIG. 5, the L-shaped section 56a of each cassette indication lever 56 projects frontward so that the green paint on the L-shaped section 56a can be easily seen via the related opening 55b. Thus, it is possible to judge the cassettes 40 or 45 to be present in the rack arrangement 50. In the case where cassettes 40 or 45 are absent from the rack arrangement 50, as shown in the second uppermost step in FIG. 5, the L-shaped section 56a of each cassette indication lever 56 assumes a deeper position with respect to the front face of the rack arrangement 50 so that the green paint on the L-shaped section 56a can not be seen via the related opening 55b. Thus, it is possible to judge the cassettes 40 or 45 to be absent from the rack arrangement 50.

A description will now be given of a mechanism for detecting the presence and absence of cassettes 40 or 45 from a front side, a mechanism for detecting the presence and absence of cassettes 40 or 45 from a rear side, and a mechanism for holding cassettes 40 or 45 in the rack arrangement 50 and releasing the cassettes 40 or 45. The cassette presence and absence detection mechanisms and the cassette holding and releasing mechanism are provided on the right-hand side panel 52 of a rack of the rack arrangement 50 in FIG. 5.

Specifically, the right-hand side panel 52 is formed integrally with steps or projections 52b extending outward and corresponding to the inward steps 52a respectively. The right-hand side panel 52 has rectangular openings 52c extending between the frontward sections of adjacent steps 52b. In addition, the right-hand side panel 52 has elliptic guide grooves 52d extending near the openings 52c respectively.

Each cassette indication lever 56 slidably extends in an opening 52c and a guide groove 52d. A pin 57 is fixed to the cassette indication lever 56. The L-shaped section 56a of the cassette indication lever 56 is located into the opening 52c in a manner such as to be capable of contacting the rear face of a cassette 40 or 45. The pin 57 is placed into the guide groove 52d. The cassette indication lever 56 can be slid while being guided along the opening 52c and the guide groove 52d.

A shutter lever 58 rotatable clockwise or counter-clockwise about a shaft 59 is provided on the part of the right-hand side panel 52 which extends near each cassette indication lever 56.

The cassette indication lever 56 and the shutter lever 58 are designed so as to cooperate while being linked with each other by operation which will be explained later. Specifically, the shutter lever 58 has a contact section 58a which can move into and out of engagement with a contact section 56b of the cassette indication lever 56. A tension spring 60 is provided between a lug 56c of the cassette indication lever 56 and a lug 58d of the shutter lever 58.

Figure 6:
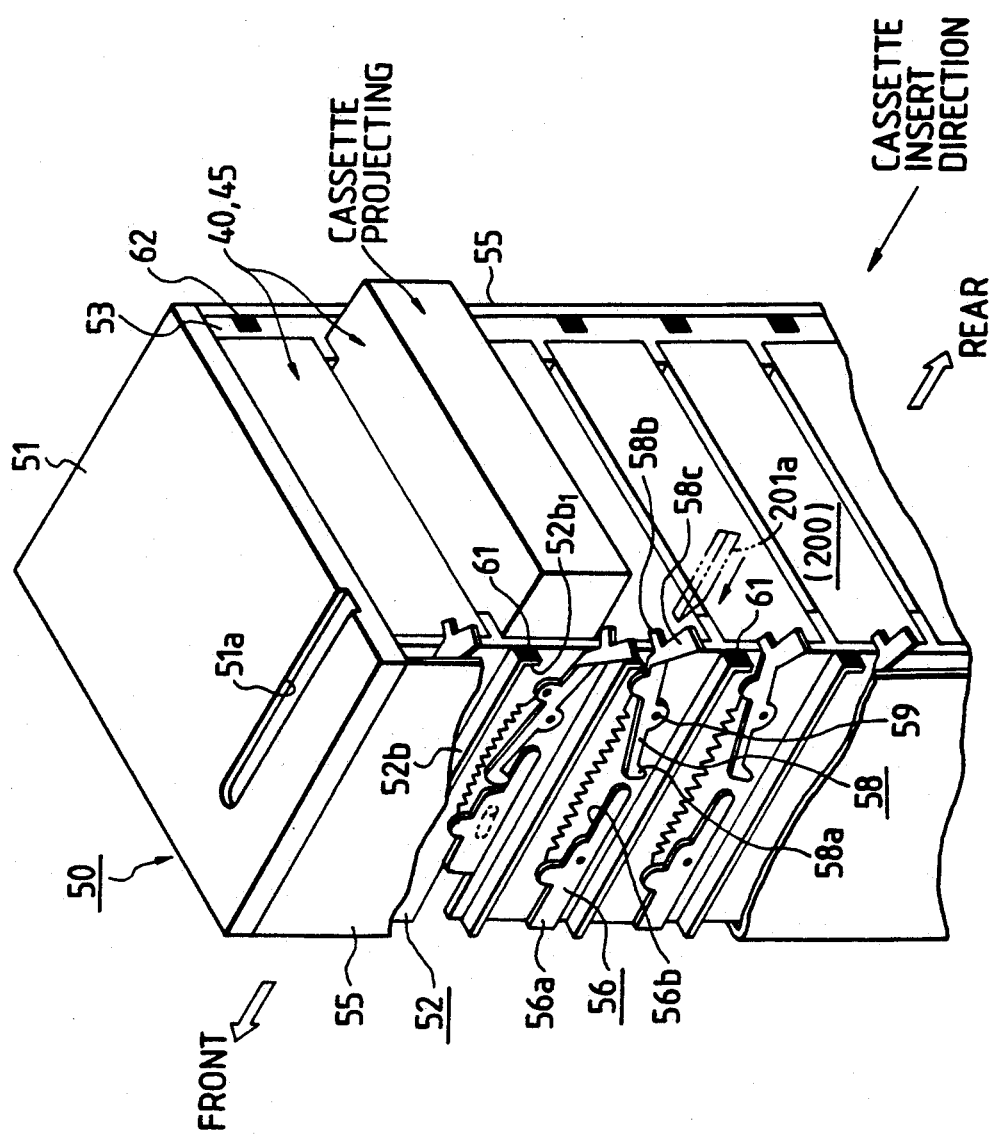
FIG. 6 is a perspective rear view of the rack with parts broken away.

When a rack in the rack arrangement 50 is seen from a back side as shown in FIG. 6, it is found that the rear of each step 52b of the right-hand panel 52 (positioned in the left side in FIG. 6) is formed with an L-shaped bent section 52b$_1$. Silver foil is fixed to a surface of the bent section 52b$_1$. In addition, silver foils 62 are fixed to the left-hand panel 53 (positioned in the right-hand side in FIG. 6). The silver foils 61 are used in the detection of the presence and absence of cassettes 40 or 45 in and from the rack arrangement 50 by photosensors 235 (see FIG. 10). The silver foils 62 are used in the detection of the positions of cassettes 40 or 45 in the rack arrangement 50 by photosensors 236 (see FIG. 10).

The end 58c of each shutter lever 58 which is opposite to its contact section 58a has a bent or oblique form so that a shutter lever releasing mechanism (a cassette releasing mechanism) 200 (see FIG. 10) can easily engage the end 58c of the shutter lever 58. The shutter lever 58 has a projection 58b which extends near the end 58c and which functions to hold the front of a cassette 40 or 45.

Figure 7:
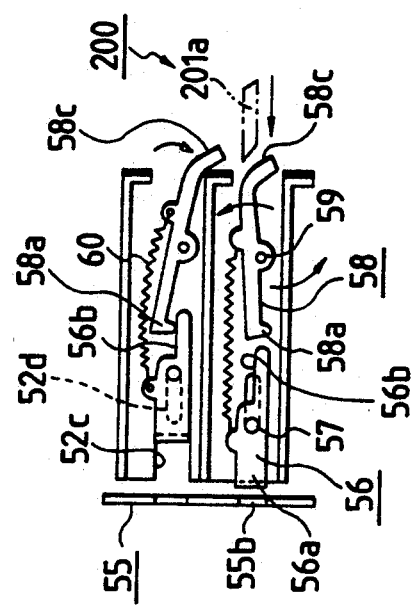
FIG. 7 is a sectional view of the rack which shows shutter levers.

The second uppermost step in FIG. 5 and the first uppermost step in FIG. 7 show conditions of the cassette indication lever 56 and the shutter lever 58 which occur in the absence of cassettes 40 or 45 from the rack arrangement 50. In this case, the cassette indication lever 56 is made close to the shutter lever 58 by the tension of the spring 60, and the contact section 58a of the shutter lever 58 engages the contact section 56b of the cassette indication lever 56. During the progress of the engagement between the contact section 58a of the shutter lever 58 and the contact section 56b of the cassette indication lever 56, the shutter lever 58 is rotated clockwise about the shaft 59 and thus the end 58c and the projection 58b of the shutter lever 58 assume lower positions. In this case, since the L-shaped section 56a of the cassette indication lever 56 can not be seen from the front side via the opening 55b in FIG. 5, a cassette 40 or 45 is judged to be absent from the related space within the rack arrangement 50. In addition, as shown in the first uppermost step in FIG. 7, the end 58c of the shutter lever 58 conceals the silver foil 61 so that information of the absence of a cassette 40 or 45 can be outputted.

The first uppermost step and the third uppermost step in FIG. 5, the first uppermost step, the third uppermost step, and the fourth uppermost step of FIG. 6, and the second uppermost step of FIG. 7 show conditions where cassettes 40 or 45 are present in the rack arrangement 50. As a cassette 40 or 45 is inserted into the rack arrangement 50, the rear of the cassette 40 or 45 contacts the L-shaped section 56a of the cassette indication lever 56 and then the cassette indication lever 56 is slid rearward against the force of the spring 60. Thus, the contact section 58a of the shutter lever 58 disengages the contact section 56b of the cassette indication lever 56, and the shutter lever 58 is rotated counterclockwise about the shaft 59 by the tension of the spring 60. As a result, the end 58c and the projection 58b of the shutter lever 58 assume upper positions (see FIG. 6). The cassette 40 or 45 is held within the rack arrangement 50 by the projection 58b of the shutter lever 58 which assumes the upper position. In this way, the cassettes 40 or 45 are completely placed in the rack arrangement 50, and the cassettes 40 or 45 are prevented from moving out of the rack arrangement 50. This results in an increased reliability of the apparatus 1.

In the case where a cassette 40 or 45 is present in the rack arrangement 50, since the L-shaped section 56a of the cassette indication lever 56 can be seen from the front side via the opening 55b in FIG. 5, the cassette 40 or 45 is judged to be present in the related space within the rack arrangement 50. In addition, as shown in the second uppermost step in FIG. 7, the end 58c of the shutter lever 58 does not conceal the silver foil 61 so that information of the presence of the cassette 40 or 45 can be outputted.

By referring to the second uppermost step in FIG. 6, a description will now be given of the case where a cassette 40 or 45 is enabled to emerge from the rack arrangement 50 by a shutter lever releasing mechanism (a cassette releasing mechanism) 200 (see FIG. 10). An end 201a (denoted by the two-dot/dash lines in FIG. 6) of a shutter releasing lever 201 in the shutter releasing mechanism 200 moves in a direction denoted by the arrow, and contacts the oblique end 58c of the shutter lever 58. As the end 201a further moves, the shutter lever 58 is rotated clockwise about the shaft 59 and the cassette indication lever 56 is slid rearward by the tension of the spring 60. In accordance with the movement of the cassette indication lever 56, the L-shaped section 56a of the cassette indication lever 56 presses the rear of the cassette 40 or 45 so that the cassette 40 or 45 is made to emerge from the rack arrangement 50 as shown in the second uppermost step in FIG. 6. In this case, the clockwise rotation of the shutter lever 58 moves the projection 58b of the shutter lever 58 to a position separate from the bottom of the cassette 40 or 45, so that the cassette 40 or 45 is released from the projection 58b of the shutter lever 58. Then, the cassette 40 or 45 is placed on the cassette mediate carrying mechanism 130 (see FIG. 10).

Figure 8:
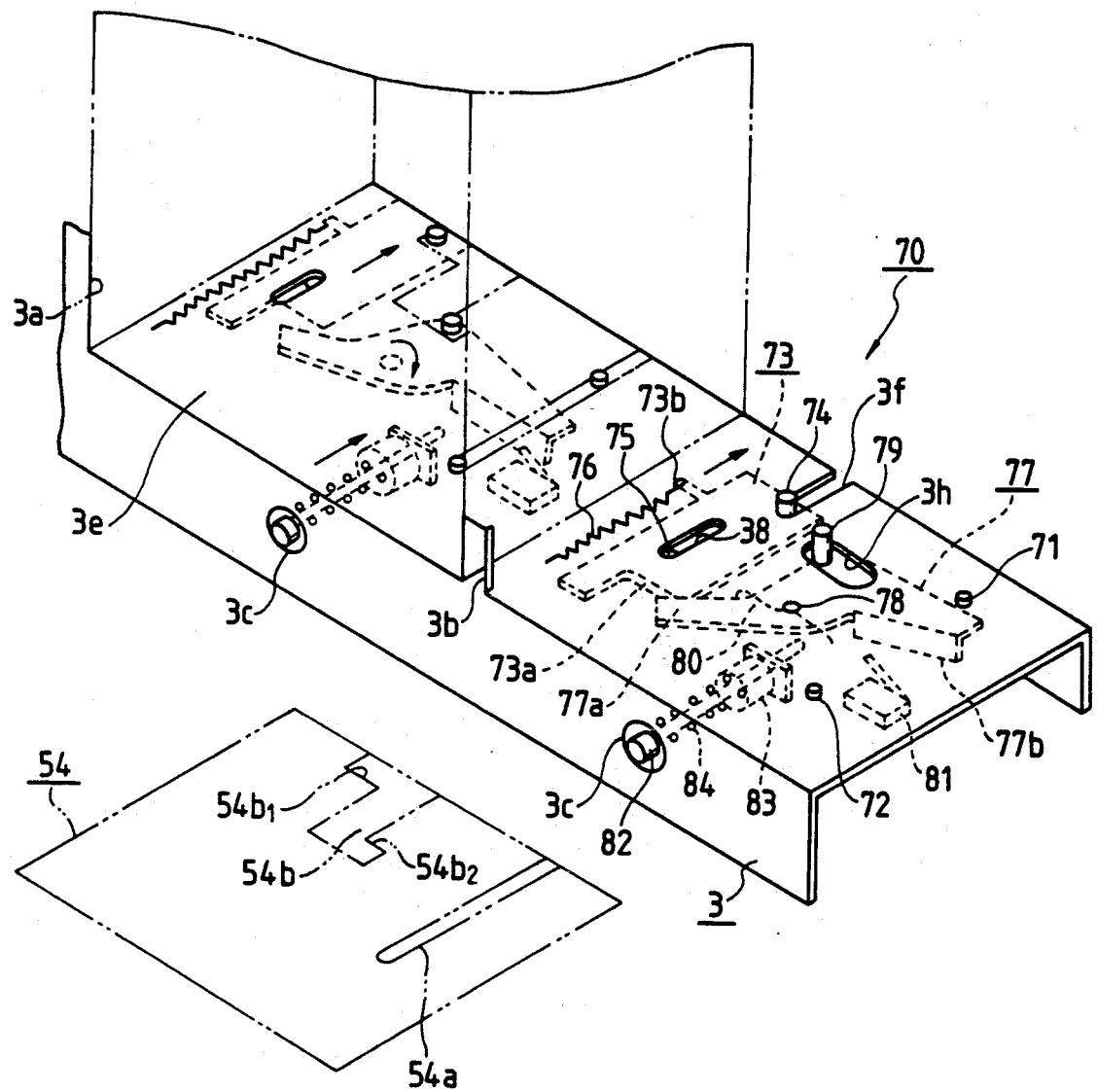
FIG. 8 is a perspective view of a part of the apparatus of FIGS. 1 and 2 which includes a mechanism for holding and releasing the rack in and from the apparatus.

A rack holding and releasing mechanism for holding the rack arrangement 50 in the apparatus 1 and releasing the rack arrangement 50 will now be described with reference to FIG. 8.

As described previously, racks of the rack arrangement 50 are placed into the apparatus 1 via the rack insertion openings 3a of the front panel 3. An inverted-U-shaped member provides a bottom face 3e extending below the rack insertion openings 3a and connected to the front panel 3. A bottom panel 54 of a rack of the rack arrangement 50 is placed on the bottom face 3e.

The part of the bottom panel 54 which contacts the bottom face 3e has an elongated guide groove 54a and a Z-shaped engagement groove 54b.

Guide pins 71 and 72 are fixed to a right-hand region of the bottom face 3e. While the bottom panel 54 of the rack of the rack arrangement 50 is placed on the bottom face 3e, the guide pins 71 and 72 are inserted into the guide groove 54a of the bottom panel 54 of the rack of the rack arrangement 50 and thus provides a guided motion of the rack. As shown in FIG. 5, the ceiling panel 51 of the rack of the rack arrangement 50 has a similar guide groove 51a, being symmetrical in shape with the bottom panel 54.

In addition, the bottom face 3e is formed with guide grooves 3f and 3g, and an engagement groove 3h.

A sliding plate 73 is slidably located below the bottom face 3e. Guide pins 74 and 75 are fixed to the sliding plate 73. The guide pins 74 and 75 are inserted into the guide grooves 3f and 3g respectively and are movable along the guide grooves 3f and 3g, enabling a guided sliding motion of the sliding plate 73. The guide pin 74 emerges upward from the guide groove 3f. A spring 74 provided between a lug 73b of the sliding plate 73 and the bottom face 3e urges the sliding plate 73 toward the front panel 3.

A rack holding lever 77 is provided below the region of the bottom face 3e near the sliding plate 73. The rack holding lever 77 can rotate about a shaft 78. A torsion spring 80 provided between the rack holding lever 77 and the bottom face 3e urges the rack holding lever 77 clockwise about a shaft 78.

One end of the rack holding lever 77 has a contact section 77a which remains in engagement with a contact section 73a of the sliding plate 73. The tension of the spring 76 is chosen so as to overcome the angular moment at the contact section 77a of the rack holding lever 77 which is generated by the torsion spring 80.

The other end of the rack holding lever 77 is formed with a switch contact section 77b of a bent shape. When the rack of the rack arrangement 50 is mounted in position, the switch contact section 77b of the rack holding lever 77 contacts a detector or a switch 81 for detecting the presence and absence of the rack of the rack arrangement 50. An engagement pin 79 is fixed to the region of the rack holding lever 77 between the contact section 77a and the switch contact section 77b. The engagement pin 79 extends through the engagement groove 3h and emerges upward from the engagement groove 3h. It should be noted that the switch 81 may be designed so as to execute detection responsive to the motion of the sliding plate 73. In addition, the switch 81 may be replaced by a detector such as a photosensor.

The front panel 3 has apertures 3c. A rack releasing rod 82 extending through each aperture 3c is slidably supported by a bearing 83 mounted on the bottom face 3e. A compression spring 84 extending around a part of the rack releasing rod 82 urges the rack releasing rod 82 toward the front panel 3 relative to the body of the bearing 83.

As the rack of the rack arrangement 50 is inserted while the guide groove 54a of the bottom panel 54 accommodates the guide pin 72, the guide pin 71 moves into the guide groove 54a. In addition, a contact section 54$b_1$ of the bottom panel 54 which defines a part of the engagement groove 54b encounters the guide pin 74 fixed to the sliding plate 73, and the engagement pin 79 fixed to the rack holding lever 77 moves into the engagement groove 54b. As the rack of the rack arrangement 50 is further moved, the guide pin 74 is moved in a direction denoted by the arrow while the guide pin 74 remains in contact with the contact section 54$b_1$. At the same time, the sliding plate 73 is also moved in the direction denoted by the arrow. This movement of the sliding plate 73 enables the rack holding lever 77 to be rotated clockwise by the torsion spring 80. As a result, the engagement pin 79 rotates into the region of the engagement groove 54b which is defined by a contact section 54$b_2$ of the bottom panel 54. Finally, the engagement pin 79 moves into engagement with the contact section 54$b_2$ of the bottom panel 54 so that the rack of the rack arrangement 50 is held in position. These conditions are shown by the two-dot/dash lines in the right-hand upper part of FIG. 8. When the rack of the rack arrangement 50 is held in position, the switch 81 contacts the switch contact section 77b of the rack holding lever 77 so that the switch 81 is activated to output information representative of the presence of the rack of the rack arrangement 50.

A description will now be given of the release of a rack of the rack arrangement 50. When the rack releasing rod 82 is pressed against the force of the compression spring 84, an inner end of the rack releasing rod 82 encounters the switch contact section 77b of the rack releasing lever 77 and then forces the rack releasing lever 77 to rotate counterclockwise. As a result, the switch 81 is separated from the switch contact section 77b of the rack releasing lever 77, and thus the switch 81 outputs information representative of the absence of the rack of the rack arrangement 50. In addition, the guide pin 74 presses the contact section 54$b_1$ of the bottom panel 54 frontward by the force of the spring 76, forcing the rack of the rack arrangement 50 to emerge from the front panel 3. Then, the rack of the rack arrangement 50 is manually removed from the apparatus 1.

The provision of the mechanism for holding a rack of the rack arrangement 50 in the apparatus 1 prevents the rack of the rack arrangement 50 from being intentionally taken out. This is an advantage in safety of the apparatus 1. In addition, since the rack holding and rack releasing mechanisms are provided, the attachment and removal of racks of the rack arrangement 50 can be reliably and completely done. Since racks of the rack arrangement 50 can be attached and removed, the replacement of cassettes 40 or 45 can be done together with replacement of racks of the rack arrangement 50. This provides improved operation characteristics.

Cassette Carrying Mechanism

The structure and operation of the cassette carrying mechanism will be described in detail with reference to FIG. 9.

Figure 9:
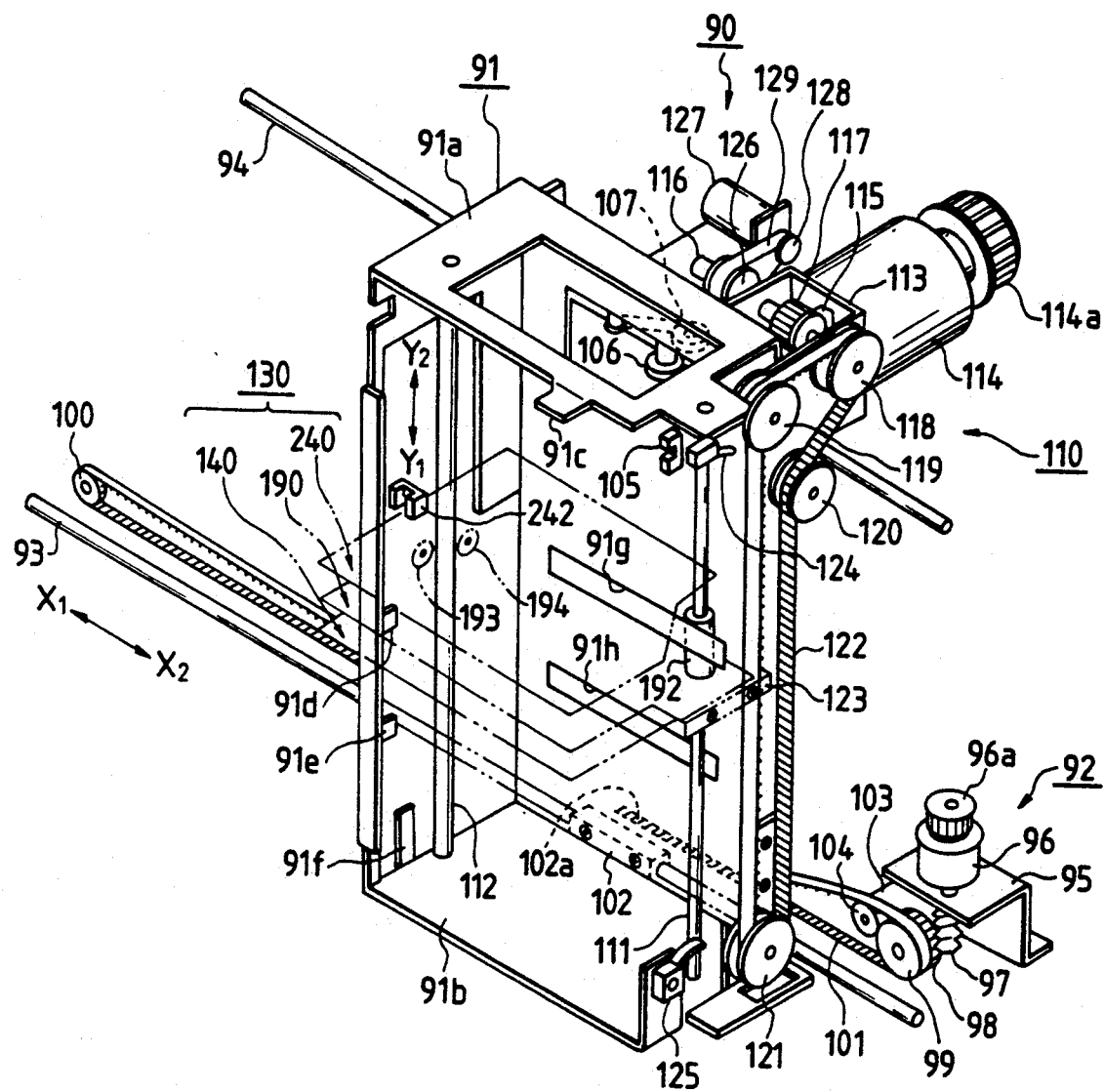
FIG. 9 is a perspective view of a cassette carrying mechanism in the apparatus of FIGS. 1 and 2.

As shown in FIG. 9, the cassette carrying mechanism 90 includes a carriage carrying mechanism 92 and a vertically moving mechanism 110. The carriage carrying mechanism 92 serves to move a carriage 91 in horizontal directions (denoted by the arrows X1 and X2) along a pair of a lower guide rail 93 and an upper guide rail 94. The vertically moving mechanism 110 serves to move the cassette mediate carrying mechanism 130 (denoted by the two-dot/dash lines in FIG. 9) in vertical directions (denoted by the arrows Y1 and Y2) along a pair of a right-hand guide rail 111 and a left-hand guide rail 112 disposed in the carriage 91.

The carriage carrying mechanism 92 will now be further explained. As shown in FIG. 2, the carriage carrying mechanism 92 includes the lower laterally-extending guide rail 93 and the upper laterally-extending guide rail 94 which are located in the region between the racks 50A-50D and the tape and disk drive units 20 and 30. The carriage 91 can move in horizontal directions (denoted by the arrows X1 and X2) along the guide rails 93 and 94. The carriage 91 takes the shape of a box, and is formed by metal plates. The carriage 91 can be selectively moved to a position frontward of the rack 50A, 50B, 50C, or 50D and a position frontward of one of the tape drive units 20 and the disk drive units 30.

As shown in the right-hand lower part of FIG. 9, a motor 96 and an encoder 103 are mounted on a bracket 95. The motor 96 is coupled to a known speed reducer. Specifically, a worm 97 mounted on a shaft of the motor 96 meshes with a worm wheel 98. Rotation of the shaft of the motor 96 is transmitted to the worm wheel 98, and is transmitted to a timing pulley 99 formed coaxially and integrally with the worm wheel 98. A timing pulley 100 distant leftward from the timing pulley 99 is connected to the timing pulley 99 by a timing belt 101. A bearing 102 fixed to the carriage 91 and extending near a bottom plate 91b of the carriage 91 is slidably mounted on the guide rail 93. The bearing 102 has a belt coupling section 102a which engages the timing belt 101. The guide rail 94 is resiliently sandwiched between rollers 106 and 107 supported on an upper part of the carriage 91. As the shaft of the motor 96 is rotated clockwise or counterclockwise, the carriage 91 is moved horizontally along the guide rails 93 and 94.

A timing pulley 104 mounted on an end of the encoder 103 meshes with the timing belt 101. Movement of the timing belt 101 rotates the timing pulley 104, activating the encoder 103. As a result, the encoder 103 outputs a pulse signal representing information of the position of the carriage 91.

A ceiling panel 91a of the carriage 91 is formed with a frontwardly-extending projection 91c, near which a photosensor 105 is provided. The projection 91c acts on switches 11 and 13 and a photosensor 12, which are provided on an upper part of the front panel 3 as shown in FIG. 2. The switches 11 and 13 serve to limit the range of horizontal movement of the carriage 91. The photosensor 12 serves to detect an initial position of the carriage 91. The detection of the position of the carriage 91 is executed by counting pulses of the output signal from the encoder 103 while using the detected initial position as a reference. Each time a power supply is turned on, the encoder 103 is initialized.

The photosensor 105 serves to detect projections $3d_1$-$3d_6$, which are formed on the upper part of the front panel 3 as shown in FIG. 2. The positions of the projections $3d_1$-$3d_6$ correspond to the positions of the racks 50A-50D, the cassette insertion openings 21a of the tape drive units 20, and the cassette insertion openings 31a of the disk drive units 30. The position of the carriage 91 is controlled in response to the output signal from the photosensor 105 so that the carriage 91 can be moved into a position frontward of arbitrary one of the racks 50A-50D, the tape drive units 20, and the disk drive units 30. The position control of the carriage 91 uses the output signal from the encoder 103 to enhance the reliability of the apparatus 1. During the position control of the carriage 91, pulses of the output signal from the encoder 103 are used for high-speed movement of the carriage 91, and are also used in accurately stopping the carriage 91 at a desired position. It should be noted that a timing pulley 96a mounted on the shaft of the motor 96 at its rear side is used for manual feed. During service or others, the timing pulley 96a is operated.

The vertically moving mechanism 110 will now be further described. With reference to FIG. 9, the vertically moving mechanism 110 serves to move the cassette mediate carrying mechanism 130 (denoted by the two-dot/dash lines) in vertical directions (denoted by the arrows Y1 and Y2) along the pair of the right-hand guide rail 111 and the left-hand guide rail 112 disposed in the carriage 91. The vertically moving mechanism 110 enables the cassette mediate carrying mechanism 130 to assume a position frontward of arbitrary one of cassettes 40 or 45, the cassette insertion openings 21a of the tape drive units 20, and the cassette insertion openings 31a of the disk drive units 30 (see FIG. 2). The vertically moving mechanism 110 is similar in principle to the carriage carrying mechanism 92, and a detailed description thereof will be omitted and a brief description will be given of an essential part thereof.

Specifically, a motor 114 provided on an upper part of the carriage 91 is coupled to a known speed reducer. Rotation of a shaft of the motor 114 is transmitted via the speed reducer to a timing pulley 118. A timing pulley 126 extends rearward of the timing pulley 118. The timing pulley 118 and the timing pulley 126 are mounted on a common shaft 116. The timing pulley 126 is coupled to a timing pulley 128 by a timing belt 129. The timing pulley 128 is connected to an encoder 127. As the shaft 116 rotates, the encoder 127 outputs a pulse signal representing the vertical position of the cassette mediate carrying mechanism 130.

The cassette mediate carrying mechanism 130 which is shown by the two-dot/dash lines in FIG. 9 includes three steps or stages, that is, a lower plate arrangement 140, an intermediate plate arrangement 190, and an upper plate arrangement 240. A bearing 192 located around the right-hand guide rail 111 has a body fixed to the intermediate plate arrangement 190. The left-hand guide rail 112 is resiliently sandwiched between a pair of rollers 193 and 194 supported on the intermediate plate arrangement 190. The intermediate plate arrangement 190 is coupled to a timing belt 122 via an engagement plate 123. The timing belt 122 connects the timing pulley 118 and other timing pulleys 119-121. Thus, the cassette mediate carrying mechanism 130 can be moved vertically.

Switches 124 and 125 are provided on right-hand edges of a ceiling panel 91a and a bottom panel 91b of the carriage 91 respectively. The switches 124 and 125 can be actuated by a contact section (not shown) of the cassette mediate carrying mechanism 130. The switches 124 and 125 serve to limit the range of vertical movement of the carriage 91. The left-hand side of the carriage 91 is formed with projections 91d-91f, which can be detected by a photosensor 242 fixed to the upper plate arrangement 240 of the cassette mediate carrying mechanism 130. The positions of the projections 91d and 91e correspond to the positions of cassette transmission openings 91g and 91h provided in a central part of the carriage 91. When the cassette mediate carrying mechanism 130 assumes a good position with respect to the position of the projection 91d or 91e, a cassette 40 or 45 can be transported between the cassette mediate carrying mechanism 130, the tape drive units 20, and the disk drive units 30 via the cassette transmission opening 91g or 91h. The projection 91f enables the detection of an initial position of the cassette mediate carrying mechanism 130. The position of the cassette mediate carrying mechanism 130 is detected by counting pulses of the output signal from the encoder 127 while using the detected initial position as a reference. Each time a power supply is turned on, the encoder 127 is initialized. During the selection of one of cassettes 40 and 45 stacked in the racks 50A-50D, the cassette mediate carrying mechanism 130 can be accurately placed with respect to the position of the selected cassette 40 or 45 by referring to pulses of the output signal from the encoder 127. The silver foils 62 (see FIG. 6) are used to enhance the reliability of the detection of the position of a cassette 40 or 45.

Cassette Mediate Carrying Mechanism

The structure and operation of the cassette mediate carrying mechanism 130 will now be described in detail with reference to FIG. 10 to FIG. 17.

The cassette mediate carrying mechanism 130 has mediate carrying functions such that a desired cassette 40 or 45 is transported from one of the racks 50A-50D to one of the tape drive units 20 and the disk drive units 30; a cassette 40 or 45 is returned from one of the tape drive units 20 and the disk drive units 30 to one of the racks 50A-50D; and cassettes 40 or 45 are exchanged in positions between different racks or within a same rack.

Figure 10:
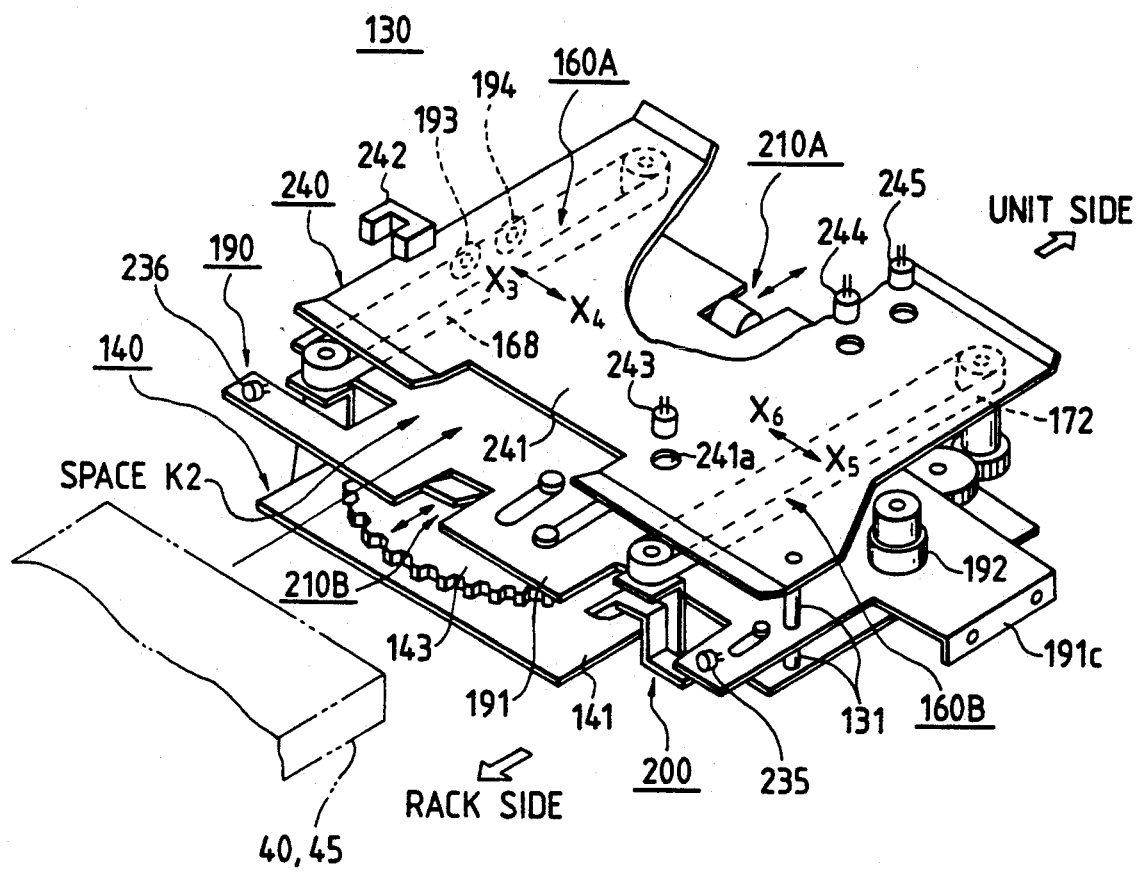
FIG. 10 is a perspective view of a cassette mediate carrying mechanism in the apparatus of FIGS. 1 and 2.

With reference to FIG. 10, the cassette mediate carrying mechanism 130 includes the lower plate arrangement 140, the intermediate plate arrangement 190, and the upper plate arrangement 240 which are connected by a plurality of studs 131 (only one of which is shown in the drawing). The lower plate arrangement 140, the intermediate plate arrangement 190, and the upper plate arrangement 240 have predetermined functions respectively as will be described later. The cassette mediate carrying mechanism 130 is moved vertically by the vertically moving mechanism 92 (see FIG. 9).

Figure 12:
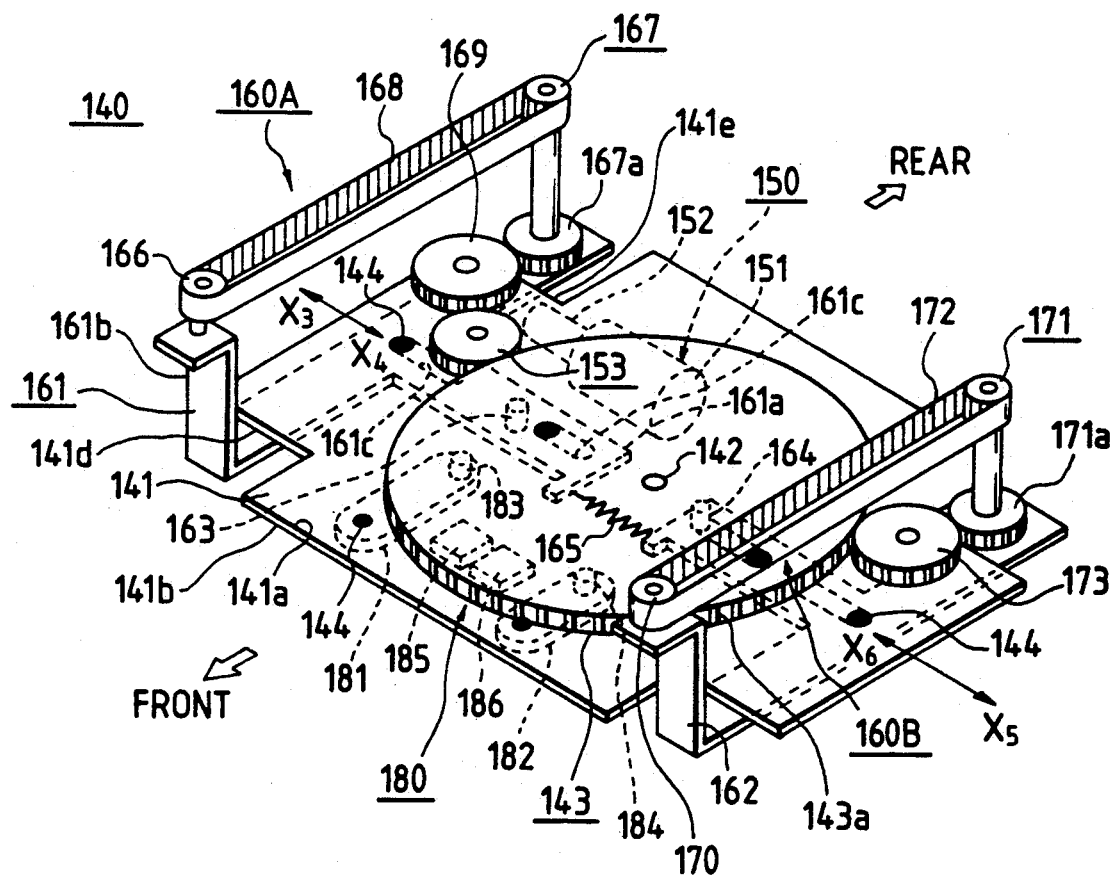
FIG. 12 is a perspective view of the lower plate arrangement of FIG. 10.

Specifically, the lower plate arrangement 140 of the cassette mediate carrying mechanism 130 is provided with a cam drive mechanism 150 (see FIG. 12), left-hand and right-hand cassette holding and carrying mechanisms 160A and 160B, and a cam position detecting mechanism 180 (see FIG. 12). The cam drive mechanism 150 serves to drive a cam 143. The cassette holding and carrying mechanisms 160A and 160B serve to hold and carry a cassette 40 or 45 taken out from the rack arrangement 50, and to hold and carry a cassette 40 or 45 ejected from one of the tape drive units 20 and the disk drive units 30.

The intermediate plate arrangement 190 is provided with a shutter lever releasing mechanism (a cassette releasing mechanism) 200, cassette pushing mechanisms 210A and 210B, and photosensors 235 and 236. The shutter lever releasing mechanism 200 serves to release a cassette 40 or 45 from the rack arrangement 50. The cassette pushing mechanisms 210A and 210B serve to finally force a cassette 40 or 45 into one of the tape drive units 20, the disk drive units 30, and the rack arrangement 50. The photosensors 235 and 236 serve to detect the left-hand and right-hand silver foils 61 and 62 (see FIG. 6) on the rack arrangement 50.

In addition, the upper plate arrangement 240 is provided with photosensors 242-245.

The previously-mentioned mechanisms and devices provided on the lower plate arrangement 140, the intermediate plate arrangement 190, and the upper plate arrangement 240 are operated and held in good timing relation with each other by the cam 143 which is driven by a common power source. Thus, the operation of the cassette mediate carrying mechanism 130 is accurate and reliable. This contributes to a good quality and a good reliability of the apparatus 1. Since the cassette mediate carrying mechanism 130 uses only a single power source, the manufacturing cost can be low. In addition, the cassette mediate carrying mechanism 130 can be composed of units. This design enables easy service. The cam 143 provides timing control of various segments of the cassette mediate carrying mechanism 130 such as shown in FIG. 17.

As shown in FIG. 10, the left-hand and right-hand cassette holding and carrying mechanisms 160A and 160B extend into the regions between the intermediate plate arrangement 190 and the upper plate arrangement 240. A space K2 which can accommodate a cassette 40 or 45 is defined between the intermediate plate arrangement 190 and the upper plate arrangement 240. When a cassette 40 or 45 is inserted into the space K, the left-hand and right-hand cassette holding and carrying mechanisms 160A and 160B hold opposite sides of the cassette 40 or 45. Then, the cassette holding and carrying mechanisms 160A and 160B start to carry the cassette 40 or 45.

The lower plate arrangement 140, the intermediate plate arrangement 190, and the upper plate arrangement 240 will be sequentially described hereinafter.

The lower plate arrangement 140 will now be explained with reference to FIGS. 10, 11, 12, and 14. As described previously, the lower plate arrangement 140 is provided with the cam drive mechanism 150, the left-hand and right-hand cassette holding and carrying mechanisms 160A and 160B, and the cam position detecting mechanism 180. Firstly, the cam 143 associated with the lower plate arrangement 140 will be explained.

Figure 11:
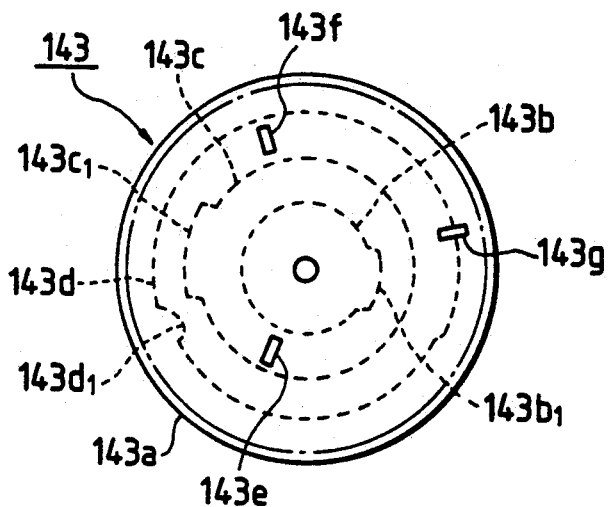
FIG. 11 is a plan view of the cam of FIG. 10.

As shown in FIG. 11, the circumferential edge of the cam 143 has gear teeth 143a. The under surface of the cam 143 has cam grooves 143b-143d extending along different circumferences. The cam grooves 143b and 143c have projecting sections 143b$_1$ and 143c$_1$ of symmetrical shapes respectively. The cam groove 143d has a recess section 143d$_1$. The upper surface of the cam 143 has projections 143e-143g extending on different circumferences. The cam 143 is made integrally of resin.

As shown in FIG. 12, the lower plate arrangement 140 includes a flat plate 141 referred to as a lower plate 141. The cam 143 is rotatable about a shaft 142 which is connected to a central part of the upper surface 141a of the lower plate 141. The under surface of the cam 143 actuates members of mechanisms of the lower plate arrangement 140. The upper surface of the cam 143 actuates members of mechanisms of the intermediate plate arrangement 190. The members of the mechanisms are actuated at good timings.

A motor 151 serving as a power source for the cam drive mechanisms 150 is provided on a central part of the under surface 141b of the lower plate 141. A worm 152 is mounted on a shaft of the motor 151. The rotation of the shaft of the motor 151 is transmitted to a worm wheel (not shown) in mesh with the worm 152, and is then transmitted to a gear 153 formed coaxially and integrally with the worm wheel. The gear 153 meshes with the gear teeth 143a of the cam 143. As the shaft of the motor 151 rotates, the cam 143 rotates clockwise or counterclockwise. The cam drive mechanism 150 is designed in this way.

The left-hand and right-hand cassette holding and carrying mechanisms 160A and 160B are provided on left-hand and right-hand parts of the under surface 141b of the lower plate 141 in a symmetrical configuration respectively. The left-hand and right-hand cassette holding and carrying mechanisms 160A and 160B serve to hold and carry a cassette 40 or 45 taken out from the rack arrangement 50, and serves to hold and carry a cassette 40 or 45 ejected from one of the tape drive units 20 and the disk drive units 30. The left-hand and right-hand cassette holding and carrying mechanisms 160A and 160B have approximately equal and symmetrical structures, and are based on a same operation principle. Thus, only the left-hand cassette holding and carrying mechanism 160A will be explained in detail, and the right-hand cassette holding and carrying mechanism 160B will be explained briefly with respect to its design which differs from the design of the left-hand cassette holding and carrying mechanism 160A.

The left-hand cassette holding and carrying mechanism 160A includes a T-shaped sliding plate 161 which is provided on the under surface 141b of the lower plate 141 and which can slide in leftward and rightward directions (denoted by the arrows X3 and X4). The sliding plate 161 has a projection 161a formed with guide grooves 161c which accommodate studs 144 (shown as black circles) fixed to the under surface 141b of the lower plate 141. A cam pin 163 is fixed to the projection 161a of the sliding plate 161. The cam pin 163 emerges from an engagement groove (not shown) formed in the lower plate 141.

The sliding plate 161 of the left-hand cassette holding and carrying mechanism 160A and a sliding plate 162 of the right-hand cassette holding and carrying mechanism 160B are urged inwardly with respect to each other by a spring 165. The cam pin 163 fixed to the sliding plate 161 extends into the cam groove 143c (see FIG. 11), and is slidable along the cam groove 143c. A cam pin 164 fixed to the sliding plate 162 extends into the cam groove 143b (see FIG. 11), and is slidable along the cam groove 143b. The projecting sections 143c$_1$ and 143b$_1$ of the cam grooves 143c and 143b are arranged in phase with each other. In the case where the cam pins 163 and 164 slide along the projecting sections 143c$_1$ and 143b$_1$, the sliding plates 161 and 162 move in outward directions (denoted by the arrows X3 and X5) and away from each other. In the case where the cam pins 163 and 164 slide along the parts of the cam grooves 143c and 143b other than the projecting sections 143c$_1$ and 143b$_1$, the sliding plates 161 and 162 move in toward directions (denoted by the arrows X4 and X6) and toward each other.

A front end of the sliding plate 161 is formed with a bent section 161b projecting upward from a cut 141d in a left-hand front part of the lower plate 141. A timing pulley 166 is rotatably mounted on the bent section 161b of the sliding plate 161. An opposite end of the sliding plate 161 is provided with a rotatable timing pulley 167.

A rotatable gear 167a extending below the timing pulley 167 is integrally formed with the timing pulley 167. A shaft of the timing pulley 167 projects upward from a cut 141e in a left-hand rear part of the lower plate 141. The timing pulleys 166 and 167 are connected by a timing belt 168. The left-hand timing belt 168 is located above the lower plate 141 in this way. As shown in FIG. 10, the left-hand timing belt 168 is also located above a flat plate 191 of the intermediate plate arrangement 190, and is specifically located between the flat plate 191 of the intermediate plate arrangement 190 and a flat plate 241 of the upper plate arrangement 240. A right-hand timing belt 172 is provided symmetrically with the left-hand timing belt 168. The left-hand timing belt 168 and the right-hand timing belt 172 cooperate to hold opposite sides of a cassette 40 or 45 and to carry the cassette 40 or 45.

In the left-hand cassette holding and carrying mechanism 160A, power transmission to the timing belt 168 is designed as follows. The gear teeth 143a of the cam 143 meshes with a gear 153 which is coupled to the gear 167a via an intermediate gear 169. Thus, the timing belt 168 is driven in accordance with the rotation of the cam 143.

In the right-hand cassette holding and carrying mechanism 160B, power transmission to the timing belt 172 is designed as follows. The gear teeth 143a of the cam 143 meshes with an intermediate gear 173 which is in engagement with a gear 171a. The gear 171a is formed coaxially and integrally with a timing pulley 171 which engages the timing belt 172. Thus, the timing belt 172 is driven in accordance with the rotation of the cam 143.

Since the number of gears between the cam 143 and the left-hand timing pulley 167 is greater than the number of gears between the cam 143 and the right-hand timing pulley 171 by one, the timing pulley 167 and the timing pulley 171 rotate in opposite directions respectively. Also, the timing belt 168 and the timing belt 172 rotate in opposite directions respectively.

In the case where the sliding plate 161 and the sliding plate 162 are most distant from each other, the gears in the power transmissions to the timing pulleys 167 and 171 are in weak engagement. In this case, the distance between the timing belts 168 and 172 is greater than the widths of cassettes 40 and 45. This case corresponds to an initial state in which it is unnecessary to carry a cassette 40 or 45.

In the case where the sliding plate 161 and the sliding plate 162 are closer to each other, the gears in the power transmissions to the timing pulleys 167 and 171 are in good engagement. In this case, the distance between the timing belts 168 and 172 is small enough to hold a cassette 40 or 45. When the cam 143 is rotated clockwise, the left-hand timing belt 168 rotates counterclockwise but the right-hand timing belt 172 rotates clockwise. Thus, a cassette 40 or 45 held between the timing belts 168 and 172 is carried from the rack arrangement 50 toward the tape drive units 20 and the disk drive units 30. On the other hand, when the cam 143 is rotated counterclockwise, a cassette 40 or 45 held between the timing belts 168 and 172 is carried from the tape drive units 20 and the disk drive units 30 toward the rack arrangement 50.

As shown in FIG. 12, the cam position detecting mechanism 180 is located in a front part of the lower plate arrangement 140. Specifically, the under surface 141b of the lower plate 141 is provided with a pair of arms 181 and 182. The arms 181 and 182 are pivotally connected to the studs 144 (shown as the black circles) so that they can actuate switches 185 and 186. Cam pins 183 and 184 fixed to ends of the arms 181 and 182 project upward through engagement grooves (not shown) in the lower plate 141, and reach the cam groove 143d (see FIG. 11). The cam pins 183 and 184 can slide along the cam groove 143d. When the cam 143 assumes an initial position, the cam pin 183 enters the recess section 143d₁ of the cam groove 143d so that the arm 181 moves into engagement with the switch 185. As a result, the switch 185 is actuated by the arm 181, and the switch 185 outputs a signal representing that the cam 143 assumes its initial position. The switch 186 outputs a signal which is used in detecting the direction of rotation of the cam 143. The direction of rotation of the cam 143 is detected and controlled in response to the output signal from the switch 186 and the output signals from photosensors 243–245 on a flat plate 241 of the upper plate arrangement 240 (see FIG. 10).

The intermediate plate arrangement 190 will now be explained with reference to FIGS. 10, 13, 15, 16A, and 16B. The intermediate plate arrangement 190 is provided with a shutter lever releasing mechanism (a cassette releasing mechanism) 200, cassette pushing mechanisms 210A and 210B, and the photosensors 235 and 236 (see FIG. 10).

Figure 13:
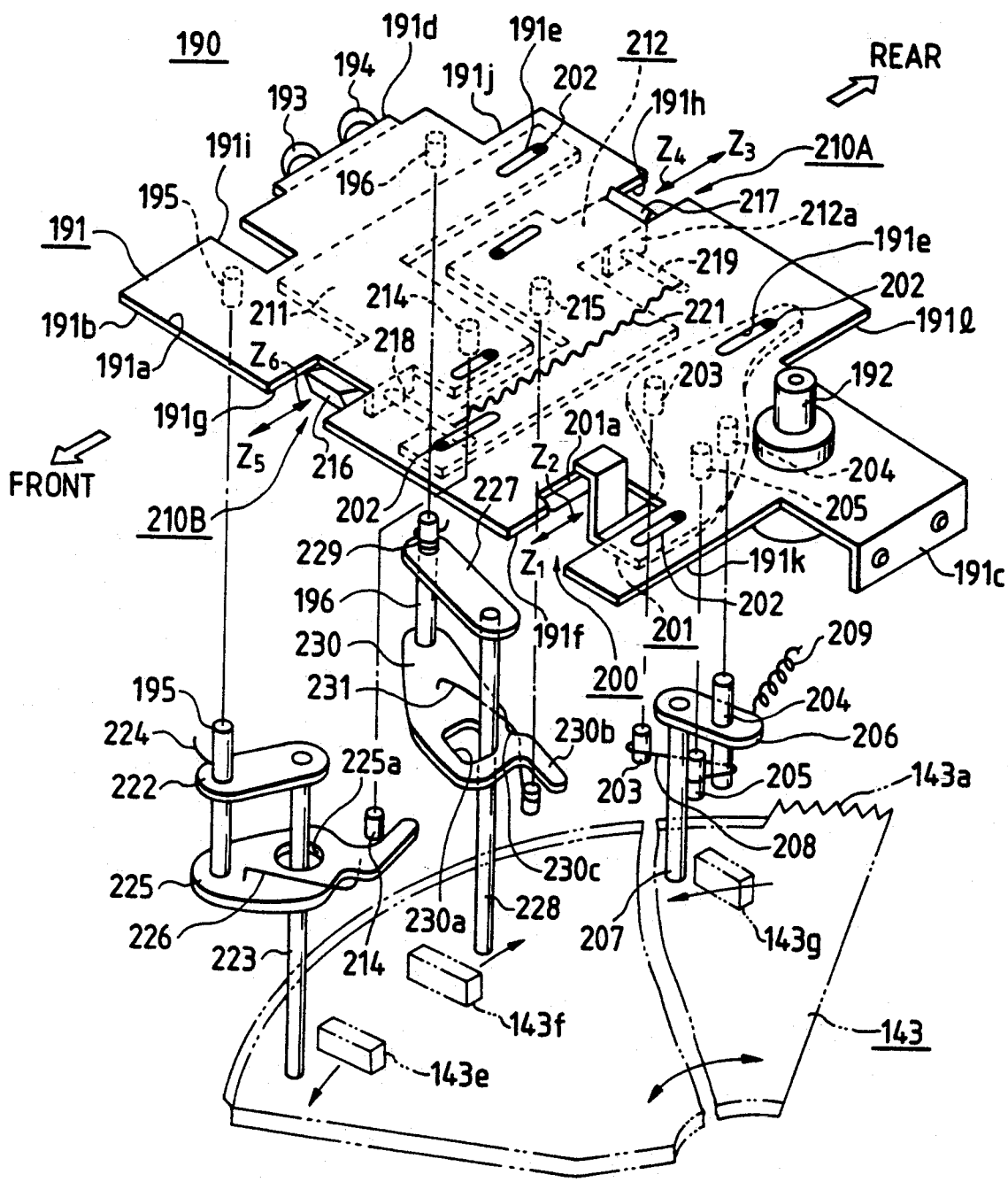
FIG. 13 is a perspective exploded view of the intermediate plate arrangement of FIG. 10.

As shown in FIG. 13, the intermediate plate arrangement 190 includes a flat plate 191 referred to as an intermediate plate 191. The intermediate plate 191 has left-hand and right-hand edges which are bent downward.

A right-hand side 191c of the intermediate plate 191 has holes for the attachment of the engagement plate 123 (see FIG. 9) coupled to the timing belt 122 (see FIG. 122). The body of a bearing 192 is fixed to the part of the intermediate plate 191 near the right-hand side 191c. The bearing 192 slidably supports the guide rail 111 (see FIG. 9). A pair of rollers 193 and 194 for resiliently supporting the guide rail 112 (see FIG. 9) are provided on a left-hand side 191d of the intermediate plate 191.

The intermediate plate 191 has cuts 191i and 191j through which the members of the left-hand cassette holding and carrying mechanism 160A (see FIG. 12) extend. The intermediate plate 191 also has cuts 191f and 191l through which the members of the right-hand cassette holding and carrying mechanism 160B (see FIG. 12) extend.

A front right-hand part of the intermediate plate 191 is provided with a shutter lever releasing mechanism (a cassette releasing mechanism) 200 for releasing a cassette 40 or 45 from the rack arrangement 50.

The shutter lever releasing mechanism 200 includes a shutter releasing lever 201 to which guide pins 202 (shown as black circles) are fixed. The intermediate plate 191 has guide grooves 191e into which the guide pins 202 extend from an under surface 191b respectively. The shutter releasing lever 201 can slide in frontward and rearward directions (denoted by the arrows Z1 and Z2). A front end 201a of the shutter releasing lever 201 extends upward through a cut 191f in the intermediate plate 191. The front end 201a of the shutter releasing lever 201 has a shape designed for easy engagement with the shutter lever 58 (see FIG. 6).

Studs 203 and 205 are fixed to a central part of the under surface of the shutter releasing lever 201. An arm 206 is pivotally connected to the stud 204. A downwardly-projecting cam pin 207 is fixed to one end of the arm 206. The other end of the arm 206 engages a spring 209 which is connected to the intermediate plate 191. Thereby, the arm 206 is urged counterclockwise about the stud 204. The spring 209 also engages the shutter releasing lever 201, and has the function of returning the shutter releasing lever 201 in the direction denoted by the arrow Z2.

One end of a torsion spring 208 is connected to the stud 203, and the other end of the torsion spring 208 is connected to the stud 205. The torsion spring 208 also engages the stud 204. The cam pin 207 fixed to the arm 206 contacts the torsion spring 208.

The shutter lever releasing mechanism 200 operates as follows. As the cam 143 provided on the lower plate 141 (see FIG. 12) is rotated clockwise, the projection 143g formed on the upper surface of the cam 143 comes into contact with the cam pin 207 fixed to the arm 206 and then the arm 206 is rotated counterclockwise about the stud 204. The rotational force on the arm 206 is transmitted from the cam pin 207 to the stud 203 via the torsion spring 208, so that the shutter releasing lever 201 is slid in the frontward direction (denoted by the arrow Z1). During this period, the end 201a of the shutter releasing lever 201 moves while contacting the end 58c of the shutter lever 58 (see FIG. 6). As a result, a cassette 40 or 45 within the rack arrangement 50 is released.

As the cam 143 is further rotated clockwise, the projection 143g on the cam 143 separates from the cam pin 207 so that the shutter releasing lever 201 is returned to its initial position by the spring 209 along the rearward direction (denoted by the arrow Z2).

In the case where the cam 143 is rotated counterclockwise, the projection 143g on the cam 143 contacts the cam pin 207, and thus the arm 206 is rotated clockwise against the force of the spring 209 but the cam pin 207 separates from the torsion spring 208. Therefore, the shutter releasing level 201 is not slid, and remains in its initial position. The counterclockwise rotation of the cam 143 is executed for returning a cassette 40 or 45 to the rack arrangement 50. It is clear that the actuation of the shutter releasing lever 201 is unnecessary in such a case.

As described previously, the right-hand cassette holding and carrying mechanism 160B (see FIG. 12) has a member for supporting the timing pulley 170 (see FIG. 12). This pulley supporting member projects upward through the opening 191f in the intermediate plate 190. As shown in FIG. 10, the pulley supporting member lies in rear of the end 201a of the shutter releasing lever 201.

As shown in FIG. 14, a rear central part of the intermediate plate 191 is provided with the cassette pushing mechanism 210A. As described previously, during the transportation of a cassette 40 or 45 to one of the tape drive units 20 and the disk drive units 30, the cassette 40 or 45 is carried toward the tape drive unit 20 or the disk drive unit 30 by the cassette holding and carrying mechanisms 160A and 160B (see FIG. 12). Then, the cassette 40 or 45 is pushed into the tape drive unit 20 or the disk drive unit 30 by the cassette pushing mechanism 210A. A front central part of the intermediate plate 191 is provided with the cassette pushing mechanism 210B. During the transportation of a cassette 40 or 45 to the rack arrangement 50, the cassette 40 or 45 is carried toward the rack arrangement 50 by the cassette holding and carrying mechanisms 160A and 160B, and then the cassette 40 or 45 is pushed into the rack arrangement 50 by the cassette pushing mechanism 210B.

The rear-side cassette pushing mechanism 210A and the front-side cassette pushing mechanism 210B have approximately equal and symmetrical structures, and are based on a same operation principle. Thus, only the rear-side cassette pushing mechanism 210A will be described in detail, and the front-side cassette pushing mechanism 210B will be explained briefly with respect to its design different from the design of the rear-side cassette pushing mechanism 210A.

The rear-side cassette pushing mechanism 210A includes a sliding plate 212 to which guide pins 202 (shown as black circles) are fixed. The intermediate plate 191 has guide grooves 191e into which the guide pins 202 extend from the under surface 191b. The sliding plate 212 can slide in a rearward direction (denoted by the arrow Z3) and a frontward direction (denoted by the arrow Z4).

As shown in FIGS. 13 and 16A, a rear central part of the intermediate plate 191 has an opening 191h near which an end 212a of the sliding plate 212 lies. The end 212a of the sliding plate 212 is bent downward. A push lever 217 is pivotally connected to the end 212a of the sliding plate 212 by an elongated pin 219. The push lever 217 is urged clockwise about the pin 219 by a torsion spring 220. The range of rotation of the push lever 217 is limited by the edge of the intermediate plate 191 which defines a part of the opening 191h. The front-side cassette pushing mechanism 210B includes a sliding plate 211, and an elongated pin 218 provided on an end of the sliding plate 211. The elongated pin 218 of the front-side cassette pushing mechanism 210B is symmetrical with the elongated pin 219 of the rear-side cassette pushing mechanism 210A. Opposite ends of a spring 221 engage the elongated pins 218 and 219, so that the sliding plates 211 and 212 are urged in inward directions (denoted by the arrows Z4 and Z6) with respect to each other.

A stud 196 is fixed to the under surface of the intermediate plate 191 near the left-hand side 191d. An upper arm 227 and a lower arm 230 are pivotally mounted on the stud 196. A downwardly-projecting cam pin 228 is fixed to one end of the upper arm 227. The other end of the upper arm 227 engages a torsion spring 229 connected to the intermediate plate 191. Thereby, the upper arm 227 is urged counterclockwise about the stud 196. A central part of the lower arm 230 has an engagement hole 230a which accommodates the cam pin 228. The torsional force of the torsion spring 229 presses the cam pin 228 against the wall of the lower arm 230 which defines the engagement hole 230a. An end of the lower arm 230 has a contact section 230b which engages a stud 215 fixed to a central part of the under surface of the lower arm 230. One end of a torsion spring 231 is connected to the stud 215. The torsion spring 231 extends from the under surface of the contact section 230b of the lower arm 230 to the upper surface of the lower arm 230 via a recess 230c in the lower arm 230. The other end of the torsion spring 231 is connected to the upper surface of the lower arm 230.

The cassette pushing mechanism 210A operates as follows. As the cam 143 provided on the lower plate 141 (see FIG. 12) is rotated clockwise, the projection 143f on the upper surface of the cam 143 comes into contact with the cam pin 228 fixed to the upper arm 227 so that the upper arm 227 is rotated counterclockwise about the stud 196. The cam pin 228 pushes the wall of the lower arm 230 which defines the engagement hole 230a, and the rotational force is transmitted from the upper arm 227 to the torsion spring 231 which extends via the recess 230c of the lower arm 230. The torsion spring 231 pushes the stud 215 in the rearward direction (denoted by the arrow Z3), sliding the sliding plate 212 in the rearward direction (denoted by the arrow Z3). It should be noted that the stud 215 is fixed to the sliding plate 212. Thus, as shown in FIG. 16B, the push lever 217 provided on the end 212a of the sliding plate 212 is released and separated from the edge of the intermediate plate 191 which defines the opening 191h, and the push lever 217 is rotated clockwise about the pin 219 by the torsion spring 220 and is moved upward. At this time, the push lever 217 can push the rear of a cassette 40 or 45, and can force the cassette 40 or 45 into one of the tape drive units 20 and the disk drive units 30.

As the cam 143 is further rotated clockwise, the projection 143f on the cam 143 separates from the cam pin 228 so that the sliding plate 212 is returned by the spring 221 in the frontward direction (denoted by the arrow Z4).

In the case where the cam 143 is rotated counterclockwise, the projection 143f on the cam 143 contacts the cam pin 228, and thus the upper arm 227 is rotated clockwise against the force of the torsion spring 229 but the cam pin 228 merely moves within the engagement hole 230a. Therefore, the lower arm 230 is not driven, and the sliding plate 212 is not operated. Thus, the push lever 217 remains in its initial position.

The counterclockwise rotation of the cam 143 is executed for returning a cassette 40 or 45 to the rack arrangement 50. It is clear that the actuation of the push lever 217 is unnecessary in such a case. During the return of a cassette 40 or 45 to the rack arrangement 50, the front-side cassette pushing mechanism 210B is activated. Specifically, in the cassette pushing mechanism 210B, the projection 143e on the cam 143 enables processes similar to the above-mentioned processes, and a push lever 216 forces the cassette 40 or 45 into the rack arrangement 50.

The upper plate arrangement 240 will now be explained with reference to FIG. 10. As described previously, the upper plate arrangement 240 is provided with the photosensors 242-245.

As shown in FIG. 10, the upper plate arrangement 240 includes a substantially flat plate 241 referred to as an upper plate 241. Front and rear edges of the upper plate 241 are inclined so that a cassette 40 or 45 can be smoothly inserted into the space K2 below the upper plate 241.

The photosensor 242 is provided on a left-hand part of the upper plate 241. The photosensor 242 serves to detect the vertical position of the cassette mediate carrying mechanism 130. Specifically, the photosensor 242 defects the projections 91d-91f on the carriage 91 (see FIG. 9). The photosensors 243-245 serve to detect the position of a cassette 40 or 45 during the transportation of the cassette 40 or 45.

A sequence of overall operation of the cassette mediate carrying mechanism 130 will be explained with reference to FIG. 17 and FIG. 18. The part (A) of FIG. 18 shows an initial state of the cassette mediate carrying mechanism 130. Under the initial state, the distance between the left-hand and right-hand cassette holding and carrying mechanisms 160A and 160B is greater than the widths of cassettes 40 and 45, and the shutter lever releasing mechanism (the cassette releasing mechanism) 200 and the front and rear cassette pushing mechanisms 210A and 210B are in their retracted positions.

As the cam 143 is rotated clockwise (see the part (C) of FIG. 17), the initial state of the part (A) of FIG. 18 advances to a next state shown in the part (B) of FIG. 18. Specifically, the shutter lever releasing mechanism 200 (see the part (D) of FIG. 17) moves outward at first and comes into contact with the shutter lever 58. The contact between the shutter lever releasing mechanism 200 and the shutter lever 58 releases a cassette 40 or 45 from the rack arrangement 50. Thus, as shown in the part (C) of FIG. 18, the cassette 40 or 45 is ejected from the rack arrangement 50. The cassette holding and carrying mechanisms 160A and 160B (see the part (E) of FIG. 17) move in the directions denoted by the arrows X4 and X6, and the timing belts 168 and 172 rotate. Thus, as shown in FIG. 18(D), the cassette 40 or 45 is held between the timing belts 168 and 172, and is carried by the timing belts 168 and 172. As the cassette 40 or 45 is further carried, the cassette pushing mechanism 210A (see the part (F) of FIG. 17) is activated. Thus, as shown in the part (E) of FIG. 18, the cassette pushing mechanism 210A pushes the rear of the cassette 40 or 45 and forces the cassette 40 or 45 into one of the tape drive units 20 and the disk drive units 30. Thereby, as shown in the part (F) of FIG. 18, the cassette 40 or 45 is completely placed into the tape drive unit 20 or the disk drive unit 30.

Overall Operation

Figure 19:
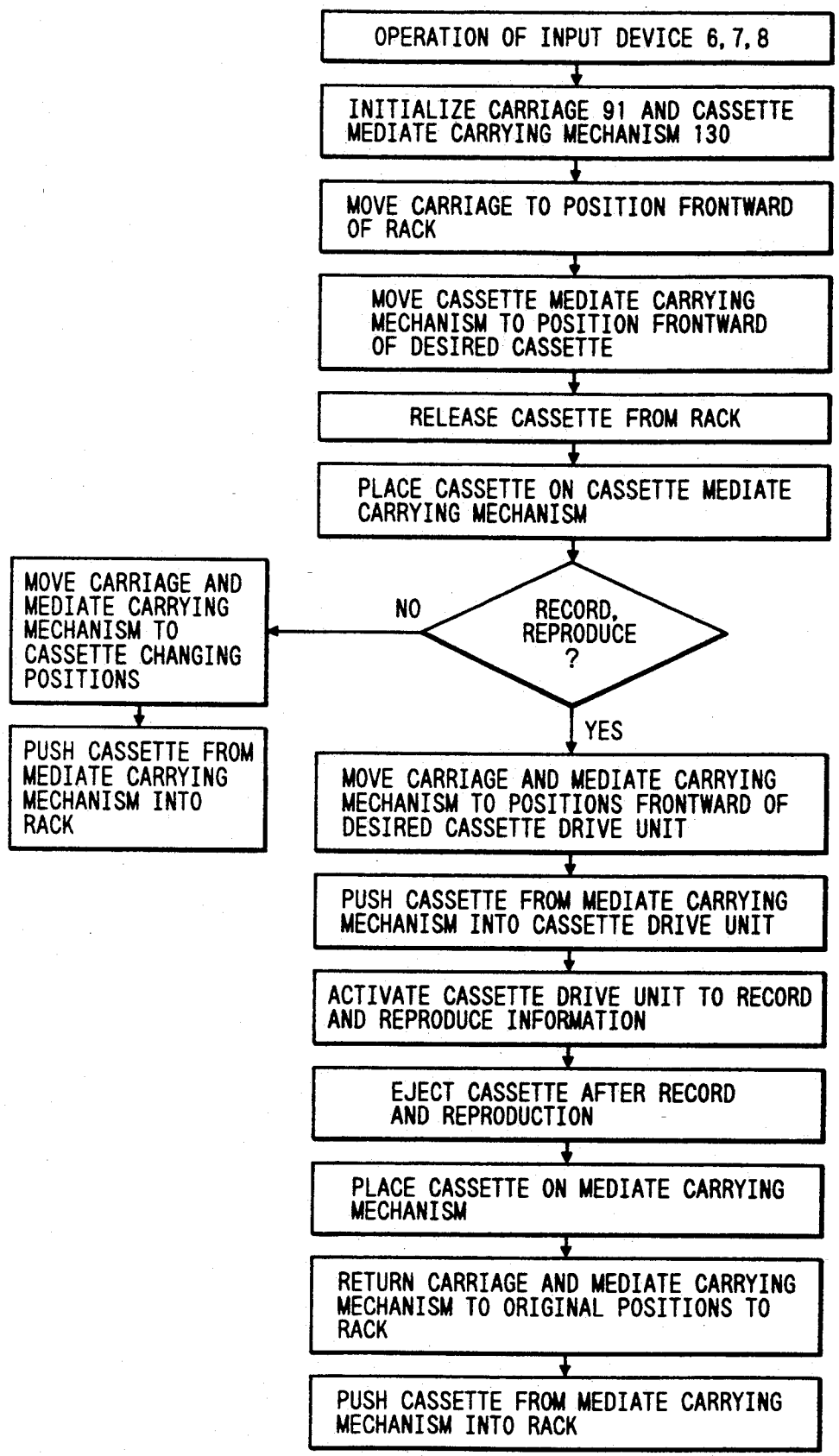
FIG. 19 is a flowchart of operation of the apparatus of FIGS. 1 and 2.

The overall operation of the multi-cassette recording and reproducing apparatus 1 is generally controlled by the control CPU and program unit 4 in response to a control program and instructions. As shown in FIG. 19, the overall operation of the apparatus 1 includes a sequence of various steps.

What is claimed is:

1. A multi-cassette recording and reproducing apparatus comprising:
   at least one rack for storing a stack of tape cassettes and disk cassettes, the tape cassettes containing magnetic tapes, the disk cassettes containing disks;
   a tape drive unit for subjecting a magnetic tape of a tape cassette to information recording and reproducing processes;
   a disk drive unit for subjecting a disk of a disk cassette to information recording and reproducing processes; and
   common cassette selecting and carrying means for selecting one of the tape cassettes in the rack, for carrying the selected tape cassette between the rack and the tape drive unit, for selecting one of the disk cassettes in the rack, and for carrying the selected disk cassette between the rack and the disk drive unit.

2. The multi-cassette recording and reproducing apparatus of claim 1 wherein said common cassette selecting and carrying means further operates to receive a cassette from a drive unit and carrying said received cassette from said drive unit to the rack,
   said common cassette selecting and carrying means comprising cassette mediate carrying means for removing one of the cassettes from the rack, for carrying the removed cassette from the rack to a cassette drive unit while holding the cassette, for pushing the carried cassette into the cassette drive unit, for receiving a cassette ejected from a cassette drive unit, for carrying the cassette received from the cassette drive unit to the rack while holding the cassette, and for pushing the cassette into the rack.

3. The multi-cassette recording and reproducing apparatus of claim 2 further comprising a cam, a single power source coupled to the cam for rotating the cam, and means for driving the cassette mediate carrying means in response to rotation of the cam, wherein the cassette mediate carrying means comprises a cassette releasing mechanism for releasing a cassette from the rack, a cassette holding and carrying mechanism including a pair of belts for carrying the released cassette from the rack to the cassette drive unit while holding the cassette, and for carrying a cassette ejected from the cassette drive unit to the rack while holding the cassette, and a cassette pushing mechanism for pushing the cassette, carried to the cassette drive unit by the cassette holding and carrying mechanism, into the cassette drive unit, and for pushing the cassette, carried to the rack by the cassette holding and carrying mechanism, into the rack.

* * * * *